(12) United States Patent
Itakura et al.

(10) Patent No.: US 10,629,158 B2
(45) Date of Patent: Apr. 21, 2020

(54) INFORMATION PROCESSING APPARATUS AND DISPLAY SYSTEM

(71) Applicant: FUJITSU LIMITED, Kawasaki-shi, Kanagawa (JP)

(72) Inventors: Kota Itakura, Kawasaki (JP); Junichi Yura, Kawasaki (JP); Tatsuro Matsumoto, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/292,164

(22) Filed: Mar. 4, 2019

(65) Prior Publication Data

US 2019/0295497 A1 Sep. 26, 2019

(30) Foreign Application Priority Data

Mar. 22, 2018 (JP) .................................. 2018-055150

(51) Int. Cl.
*G06F 3/14* (2006.01)
*G09G 5/00* (2006.01)
*G06F 3/0488* (2013.01)

(52) U.S. Cl.
CPC ......... *G09G 5/005* (2013.01); *G06F 3/04886* (2013.01); *G06F 3/1446* (2013.01);
(Continued)

(58) Field of Classification Search
CPC .................................................. G06F 3/04886
(Continued)

(56) References Cited

U.S. PATENT DOCUMENTS

| 6,654,036 | B1 * | 11/2003 | Jones | .................... | G06F 3/0481 |
| | | | | | 715/788 |
| 7,069,516 | B2 * | 6/2006 | Rekimoto | ............... | G06F 3/011 |
| | | | | | 715/757 |

(Continued)

FOREIGN PATENT DOCUMENTS

| JP | 2012-108772 A | 6/2012 |
| JP | 2016-170588 A | 9/2016 |

(Continued)

OTHER PUBLICATIONS

Fujitsu Laboratories Ltd. et al."Fujitsu Develops User Interface Technology that Converts Entire Rooms into Digital Spaces", Begin Field Trial of ICT-Facilitated Co-Creation Support (Jul. 27, 2015) website: http://www.fujitsu.com/global/about/resources/news/press-releases/2015/0727-01.html (Total 5 pages).

*Primary Examiner* — Daniel Rodriguez
(74) *Attorney, Agent, or Firm* — Fujitsu Patent Center

(57) ABSTRACT

An information processing apparatus includes a processor. The processor specifies regions surrounded by a boundary line between a range through which a rectangular window passes and a range through which the window does not pass as an arrangement candidate region of the window in a display region when a center of the window is moved according to an outer frame of the display region in a case where it is detected that a display position of the window is a first position at which the window protrudes from the display region, determines a position closest to the first position as an arrangement candidate position of the window among arrangement candidate regions, and arranges the center of the window at the arrangement candidate position when the window does not protrude from the display region in a case where the arrangement candidate position and the center of the window match each other.

8 Claims, 22 Drawing Sheets

(52) U.S. Cl.
CPC .............. *G06F 2203/04803* (2013.01); *G09G 2300/026* (2013.01); *G09G 2356/00* (2013.01)

(58) Field of Classification Search
USPC ........................................................ 715/788
See application file for complete search history.

(56) References Cited

U.S. PATENT DOCUMENTS

| | | | | |
|---|---|---|---|---|
| 8,627,229 | B2* | 1/2014 | Iizuka | G06F 3/0481 715/764 |
| 10,114,499 | B2* | 10/2018 | Gasselin de Richebourg | G06F 3/0416 |
| 2004/0261038 | A1* | 12/2004 | Ording | G06F 3/0481 715/792 |
| 2007/0288863 | A1* | 12/2007 | Ording | G06F 3/0481 715/788 |
| 2010/0194703 | A1* | 8/2010 | Fedor | G06Q 30/02 345/173 |
| 2011/0037720 | A1* | 2/2011 | Hirukawa | G06F 3/0488 345/173 |
| 2011/0164048 | A1* | 7/2011 | Murakami | G06F 3/0481 345/581 |
| 2014/0035855 | A1* | 2/2014 | Feldman | G06F 3/0488 345/173 |
| 2015/0089442 | A1* | 3/2015 | Kang | G06F 3/0488 715/788 |
| 2015/0143285 | A1* | 5/2015 | Wei | G06F 3/0481 715/799 |
| 2017/0315708 | A1* | 11/2017 | Judd | G06F 3/04886 |
| 2018/0164952 | A1* | 6/2018 | Yao | G06F 3/04815 |
| 2018/0181286 | A1* | 6/2018 | McKay | G06F 3/04886 |
| 2020/0013377 | A1* | 1/2020 | Itakura | G06F 3/1446 |

FOREIGN PATENT DOCUMENTS

| | | |
|---|---|---|
| JP | 2016-201036 A | 12/2016 |
| JP | 2017-016314 A | 1/2017 |

\* cited by examiner

FIG. 5

<CONTENT DB 40>

| CONTENT ID | CONTENT DATA POSITION | COEFFICIENT ||
| --- | --- | --- | --- |
| | | SIZE CHANGE COEFFICIENT $\alpha$ | ROTATIONAL AMOUNT COEFFICIENT $\beta$ |
| content1 | http//192.168.10.1/content1.png | 2 | 100 |
| content2 | http//192.168.10.1/content2.html | 2 | 2 |

<DISPLAY DEVICE INFORMATION TABLE 42>

| DISPLAY ID | NETWORK ADDRESS | SCREEN SIZE | | ARRANGEMENT ON CONNECTION REGION | | |
|---|---|---|---|---|---|---|
| | | WIDTH | HEIGHT | X | Y | ROTATION |
| WALL1 | 192.168.10.2 | 1980 | 1024 | 0 | 0 | 0 |
| WALL2 | 192.168.10.3 | 1980 | 1024 | 1980 | 0 | 0 |
| TABLE | 192.168.10.4 | 1980 | 1024 | 2520 | 1024 | 90 |

FIG. 7A

<CONNECTION SCREEN REGION INFORMATION TABLE 44>

| VERTEX | x | y | SHAPE | INSIDE |
|---|---|---|---|---|
| V0 | 0 | 0 | ⬒ | LOWER RIGHT SIDE |
| V1 | 3960 | 0 | ⬒ | LOWER LEFT SIDE |
| V2 | 3660 | 1024 | ⬒ | UPPER LEFT SIDE |
| V3 | 2520 | 1024 | ⬓ | UPPER LEFT SIDE |
| V4 | 2520 | 3060 | ⬒ | UPPER LEFT SIDE |
| V5 | 1440 | 3060 | ⬒ | UPPER RIGHT SIDE |
| V6 | 1440 | 1024 | ⬓ | UPPER RIGHT SIDE |
| V7 | 0 | 1024 | ⬒ | UPPER RIGHT SIDE |

FIG. 7B

<WINDOW ARRANGEMENT INFORMATION TABLE 46>

| WINDOW ID | CONTENT ID | ARRANGEMENT INFORMATION | | | | |
|---|---|---|---|---|---|---|
| | | X | Y | WIDTH | HEIGHT | RO-TATION |
| WINDOW1 | CONTENT1 | 800 | 400 | 500 | 300 | 30 |
| WINDOW2 | CONTENT2 | 1800 | 300 | 1000 | 500 | 0 |
| WINDOW3 | CONTENT2 | 2520 | 1900 | 1000 | 400 | 120 |

INFORMATION PROCESSING APPARATUS AND DISPLAY SYSTEM

CROSS-REFERENCE TO RELATED APPLICATION

This application is based upon and claims the benefit of priority of the prior Japanese Patent Application No. 2018-055150, filed on Mar. 22, 2018, the entire contents of which are incorporated herein by reference.

FIELD

The embodiments discussed herein are related to an information processing apparatus and a display system.

BACKGROUND

There is a content display system in which screen regions of a plurality of display devices are linked and treated as one display region and a content window is displayed in the display region (see, e.g., Non-Patent Document 1).

Related techniques are disclosed in, for example, Japanese Laid-open Patent Publication No. 2017-016314 and an article by Fujitsu Laboratories Ltd. et.al., entitled "Fujitsu Develops User Interface Technology that Converts Entire Rooms into Digital Spaces," <URL: http://www.fujitsu.com/global/about/resources/news/press-releases/2015/0727-01.html> ("Non-Patent Document 1").

SUMMARY

According to an aspect of the embodiments, an information processing apparatus includes a processor. The processor specifies regions surrounded by a boundary line between a range through which a rectangular window passes and a range through which the window does not pass as an arrangement candidate region of the window in a display region when a center of the window is moved according to an outer frame of the display region in a case where it is detected that a display position of the window is a first position at which the window protrudes from the display region, determines a position closest to the first position as an arrangement candidate position of the window among arrangement candidate regions, and arranges the center of the window at the arrangement candidate position when the window does not protrude from the display region in a case where the arrangement candidate position and the center of the window match each other.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 5 is a diagram illustrating an example of a content DB;

FIG. 7A is a diagram illustrating an example of a connection screen region information table and FIG. 7B is a diagram illustrating an example of a window arrangement information table;

DESCRIPTION OF EMBODIMENTS

The display region connected as described above is not particularly a rectangular region but may have a shape such as a convex shape, a T shape, and a concave shape. In this case, when a window is displayed at a position designated (or moved) by a user, the window may not enter the display region, but may protrude. In the related art, a range in which the window does not protrude in the display region is calculated by a process called a morphology operation so as to rearrange the window. However, in the related art, since a movement distance may increase when the window is rearranged at a position at which the window does not protrude, a length of the movement distance may give a sense of discomfort to the user.

Hereinafter, an embodiment of a display system will be described in detail with reference to FIGS. 1 to 22F.

Figure 1:
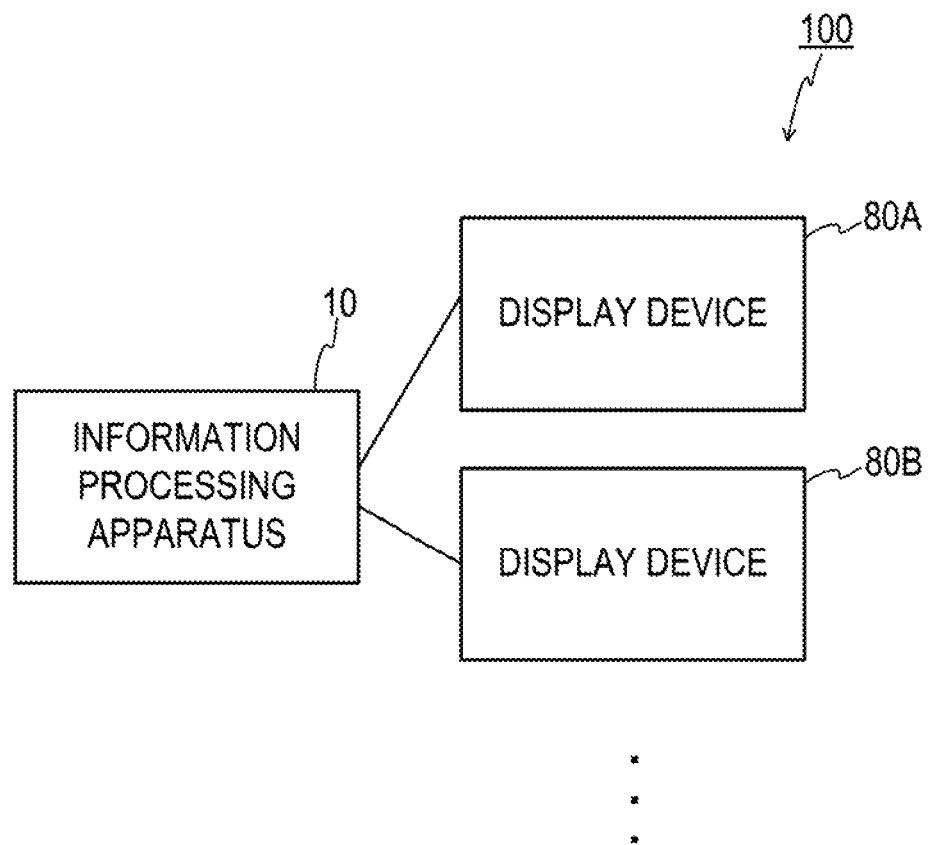
FIG. 1 is a block diagram schematically illustrating a configuration of a display system according to an embodiment.
Figure 2:
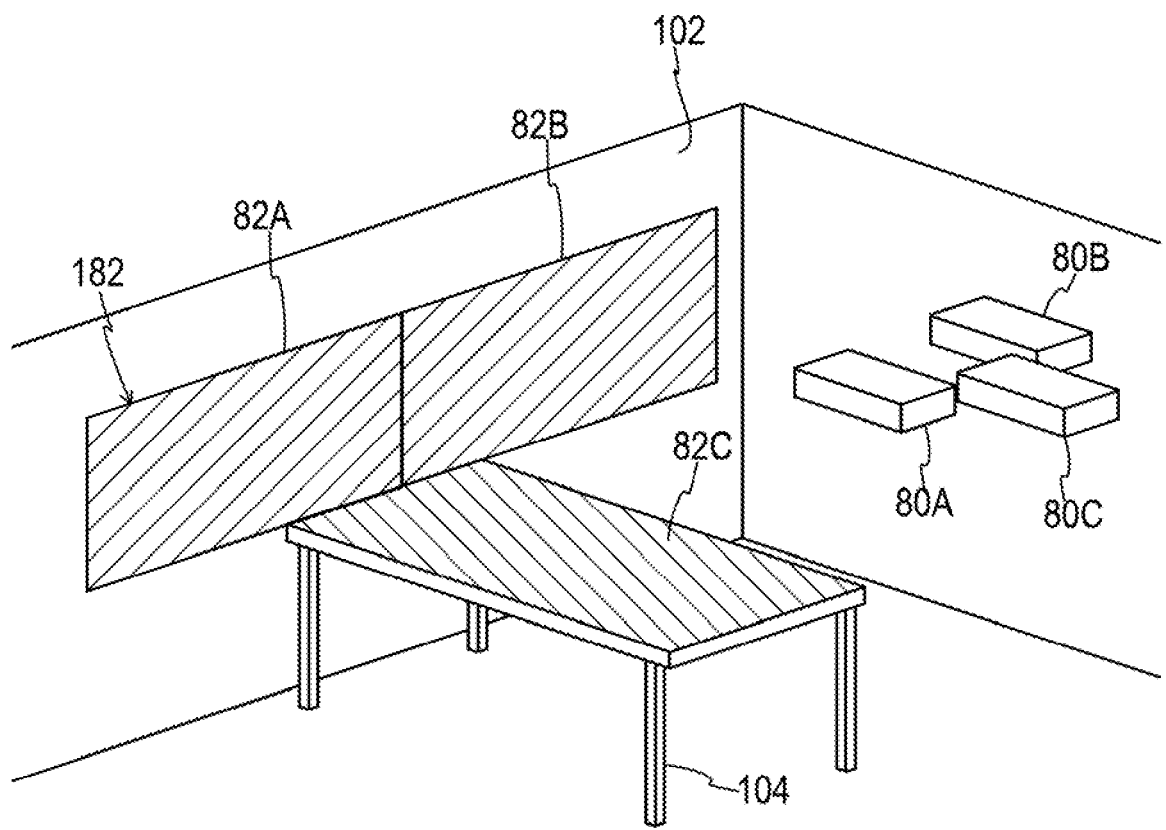
FIG. 2 is a diagram illustrating a use example of the display system.

FIG. 1 schematically illustrates a configuration of a display system 100 according to an embodiment. Further, FIG. 2 illustrates a use example of the display system 100. The display system 100 displays screen regions 82A to 82C on a wall surface 102 and an upper surface of a table 104, for example, as illustrated in FIG. 2 and is a system that displays a window of contents in a connection screen region 182 by generating the connection screen region (display region) 182 connected. For example, a plurality of users is gathered, and displays multiple windows of sticky notes application in the connection screen region 182 by using the display system 100 so as to perform brainstorming, etc.

The display system 100 includes a plurality of display devices 80A, 80B, etc., and an information processing apparatus 10 as illustrated in FIG. 1. In the example of FIG. 2, the display system 100 includes three display devices 80A to 80C each having a projector, and two display devices 80A and 80B among three display devices project the screen regions 82A and 82B onto the wall surface 102 and one remaining display device 80C projects the screen region 82C onto the upper surface of the table 104. In the embodiment, the connection screen region 182 in which the screen regions 82A to 82C are connected to each other has a substantially T shape when expanded in the same plane as represented by attaching a hatching in FIG. 2. A screen displayed by the display devices 80A to 80C is provided from the information processing apparatus 10. Further, the information processing apparatus 10 and the display devices 80A to 80C may be connected to each other by a network such as the Internet. That is, the information processing apparatus 10 may be disposed in a space separated from the display devices 80A to 80C.

The display devices 80A to 80C include the projector and a detection circuit that detects a touch operation in the screen region (e.g., an infrared camera). The display devices 80A to 80C include the projector so as to implement a function as a screen display circuit 84 illustrated in FIG. 3 and include the detection circuit so as to implement a function as an input accepting circuit 86.

The input accepting circuit 86 detects the touch operation in the connection screen region 182 by the user and transmits contents of the touch operation to the information processing apparatus 10. The screen display circuit 84 receives information of the screen transmitted from the information processing apparatus 10 and displays the screen on the connection screen region 182 based on the received information of the screen. Further, the information processing apparatus 10 changes the screen information in accordance with the touch operation by the user and transmits the changed screen information to the screen display circuit 84. Thus, the screen display circuit 84 may display the screen depending on the touch operation by the user. For example, the user draws a predetermined figure (e.g., a triangle) in the connection screen region 182 by the touch operation so as to issue an instruction to newly display a window of an annotation application to the information processing apparatus 10. In this case, according to a position or an angle of drawing the predetermined figure, a display position or an angle of the window is determined. Further, the user may drag or pinch out the window of the annotation application to issue an instruction for a purpose of movement of the window, change of a size, change of the angle, or the like to the information processing apparatus 10.

Figure 3:
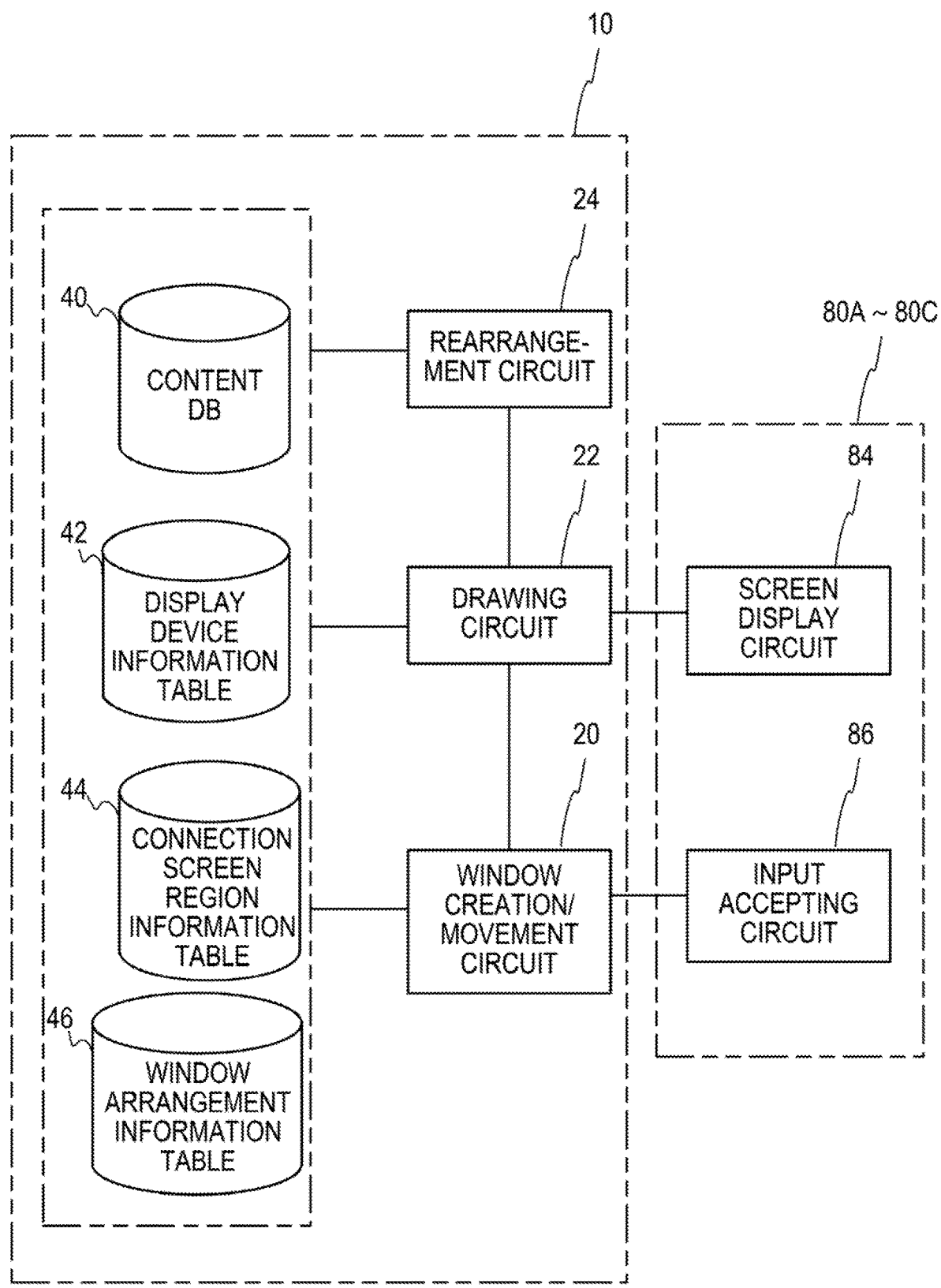
FIG. 3 is a functional block diagram of the display system.
Figure 4:
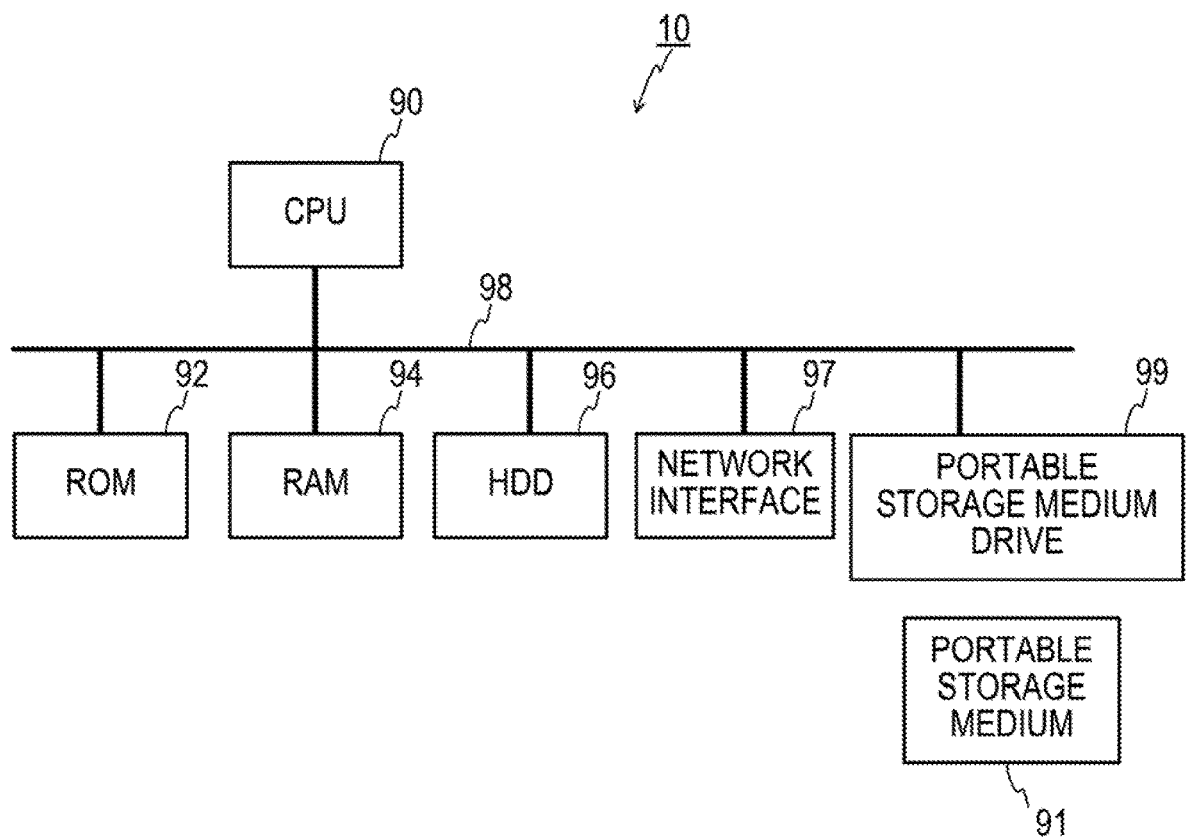
FIG. 4 is a diagram illustrating a hardware configuration of an information processing apparatus.

The information processing apparatus 10 is a server or a personal computer (PC) and has a hardware configuration illustrated in FIG. 4. As illustrated in FIG. 4, the image processing apparatus 10 includes a central processing unit (CPU) 90, a read only memory (ROM) 92, a random access memory (RAM) 94, a storage circuit (here, a hard disk drive (HDD)) 96, a network interface 97, and a portable storage medium drive 99. Each constituent unit of the information processing apparatus 10 is connected to a bus 98. In the information processing apparatus 10, the CPU 90 executes a program stored in the ROM 92 or the HDD 96 (including a window arrangement program) or a program which the portable storage medium drive 99 reads from the portable storage medium 91 (including the window arrangement program) so as to implement the function of each unit illustrated in FIG. 3. In addition, the function of each unit of FIG. 3 may be implemented by an integrated circuit such as an application specific integrated circuit (ASIC) or a field programmable gate array (FPGA).

In the information processing apparatus 10, the CPU 90 executes the program to implement functions as a window creation/movement circuit 20, a drawing circuit 22, and a rearrangement circuit 24 illustrated in FIG. 3.

The window creation/movement circuit 20 determines whether to create a new window or move an existing window based on the information of the touch operation received from the input accepting circuit 86 of the display devices 80A to 80C. Further, the window creation/movement circuit 20 stores information on a position at which the window is created and a position to which the window moves in a window arrangement information table 46. In addition, details of the window arrangement information table 46 will be described later.

The drawing circuit 22 creates (draws) the screen according to the touch operation by the user and transmits the screen to the display devices 80A to 80C. Here, the drawing circuit 22 executes a creation (drawing) process of the screen by referring to the content DB 40, the display device information table 42, the connection screen region information table 44, and the window arrangement information table 46.

Here, the content DB 40 is a database that stores information regarding the content displayed in the window and has a data structure illustrated in FIG. 5. Specifically, the content DB 40 includes each field of a "content ID", a "content data position", and a "coefficient". The field of the "content ID" stores identification information of the content and the field of the "content data position" stores information on a place storing the content. Further, the field of the "coefficient" stores a coefficient which the rearrangement circuit 24 uses at the time of rearranging the window, but details thereof will be described later.

Figures 6A, 6B:
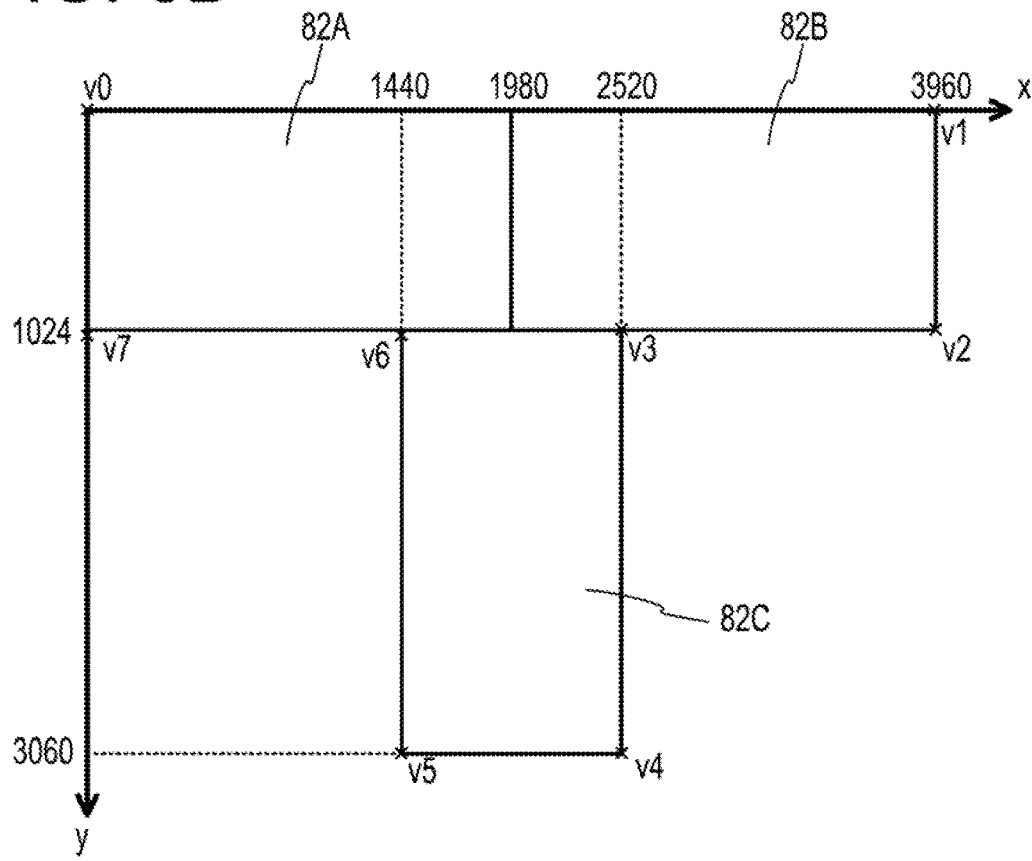
FIG. 6A is a diagram illustrating an example of a display device information table and FIG. 6B is a diagram illustrating a connection screen region on a coordinate system.

The display device information table 42 has a table structure illustrated in FIG. 6A. Specifically, the display device information table 42 includes each field of a "display ID", a "network address", a "screen size", and an "arrangement on connection region". Here, the display device information table 42 of FIG. 6A stores information regarding a case where arrangements or sizes of the screen regions 82A to 82C of the respective display devices 80A to 80C on a coordinate system illustrated in FIG. 6B are illustrated. Further, actually, since a portion displayed on the wall surface 102 and a portion displayed on the upper surface of the table 104 in the screen region are not present in the same plane, a state where the portions are developed onto the same plane is illustrated on the same coordinate system in FIG. 6B.

In the display device information table 42, the field of the "display ID" stores the identification information of the screen region. Further, in FIG. 6A, the display ID of the display device 80A is displayed as "wall1", the display ID of the display device 80B is displayed as "wall2", and the display ID of the display device 80C is displayed as "table". The field of the "network address" stores network addresses of the respective display devices 80A to 80C. The field of the "screen size" stores information on a width and a height of the screen region of each display device. Further, the width refers to a length of a side that extends in an x-axis direction when the angle of the screen region is 0°, and the height refers to a length of a side that extends in a y-axis direction when the angle of the screen region is 0°. The field of the "arrangement on connection region" stores information on a position (x, y) of a predetermined vertex of each screen region and a rotational angle. The predetermined vertex means an upper left vertex when the rotational angle of the screen region is 0°. For example, in the case of the screen region 82C (display ID =table), since the screen region 82C rotates by 90° with respect to other screen regions 82A and 82B, the predetermined vertex becomes a vertex indicated by a symbol "v3" in FIG. 6B.

The connection screen region information table 44 is a table that stores information on each vertex (v0 to v7) of the connection screen region 182, which is obtained from the display device information table 42 (i.e., FIG. 6B). Further, the connection screen region information table 44 is a table that is automatically created based on the display device information table 42 by the information processing apparatus 10.

Figure 8A:
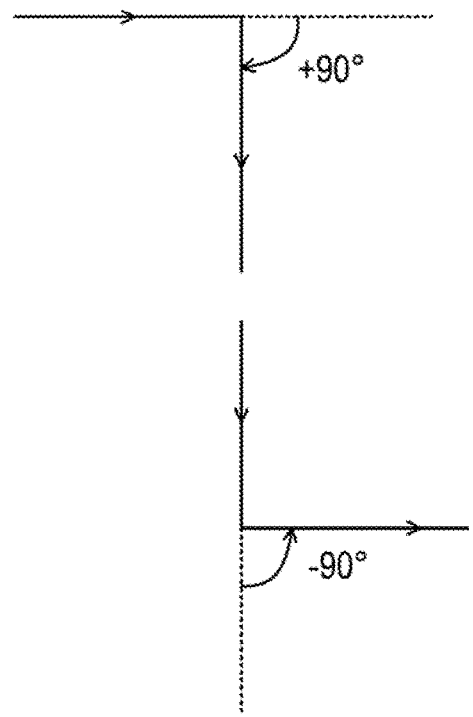
FIGS. 8A and 8B are diagrams for describing details of the connection screen region information table.
Figure 8B:
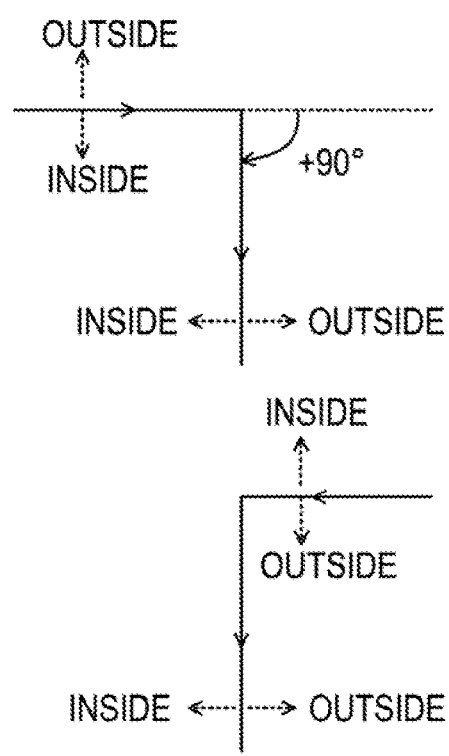

FIG. 7A illustrates the connection screen region information table 44. As illustrated in FIG. 7A, the connection screen region information table 44 has each field of "vertex", "x", "y", "shape", and "inside". The field of the "vertex" stores "v0" to "v7" as identification information of the vertex. In the embodiment, the identification information is assigned to each vertex in a clockwise direction by taking an upper left vertex of the connection screen region 182 in FIG. 68 as "v0". Here, as an overlap computation between polygons on a two-dimensional plane (Boolean operation), for example, a vatti clipping method or the like is known. By using such a method, vertex coordinates of the connection screen regions may be obtained in order. Further, when the angle between sides is defined as illustrated in FIG. 8A, the clockwise direction is established when the sum of angles formed by respective sides becomes 360° and the counter-clockwise direction is established when the sum of the angles becomes −360°. The fields of the "x" and the "y" store an x coordinate and a y coordinate of each vertex. The field of the "shape" stores any one of "the convex" and the "concave". When it is known which direction the clockwise direction is, it is known which side of the side is inside the screen region, and as a result, a case where the side is bent inward is defined as the "convex" as illustrated in an upper end of FIG. 8B and a case where the side is bent outward as illustrated in a lower end of FIG. 8B is defined as the "concave". In the example of FIG. 6B, the vertexes "v0", "v1", etc. are "convex", but the vertexes "v3" and "v6" are "concave". The field of the "inside" stores information indicating which side of left and right sides of the side extending in the y-axis direction the inside of the screen region is and which side of upper and lower sides of the side extending in the x-axis direction is.

The window arrangement information table 46 is a table that manages arrangement information of the window created by the touch operation by the user. The window arrangement information table 46 is a table illustrated in FIG. 7B. As illustrated in FIG. 7B, the window arrangement information table 46 has each field of a "window ID", a "content ID", and "arrangement information". The field of the "window ID" stores the identification information of the window. For example, identification information "window1", "window2", etc. are allocated to the window in an order in which the windows are created by the user. The field of the "content ID" stores identification information indicating a type of content displayed in each window. For example, the content ID of an image may be "content1" and a content ID of the notation application may be "content2". The field of the "arrangement information" stores arrangement information (x, y, width, height, and rotation) of each window. X and y refer to x and y coordinates of a predetermined vertex (a vertex located at an upper left portion when the angle is 0°) of each window. The width and the height refer to a width (the length of the side extending in the x-axis direction when the angle of the window is 0°) and a height (the length of the side extending in the y-axis direction when the angle of the window is 0°) of each window. The rotation refers to the rotational angle of each window.

Referring back to FIG. 3, the rearrangement circuit 24 executes a process of rearranging the window when the window protrudes from the connection screen region 182 in the screen information drawn by the drawing circuit 22. A result of the rearrangement by the rearrangement circuit 24 (information on a position at which the window is rearranged, a size of the window after rearrangement, and a rotational amount) is stored in the window arrangement information table 46. The drawing circuit 22 creates (draws) the screen information based on the result of the rearrangement by referring to the window arrangement information table 46 and transmits the created screen information to the display devices 80A to 80C (screen display circuit 84). Further, the rearrangement circuit 24 refers to the content DB 40, the display device information table 42, the connection screen region information table 44, and the window arrangement information table 46 at the time of executing the process.

(Process of Information Processing Apparatus 10)

Next, the process of the information processing apparatus 10 according to the embodiment will be described in detail according to the flowchart while referring to other drawings as appropriate.

Figure 9:
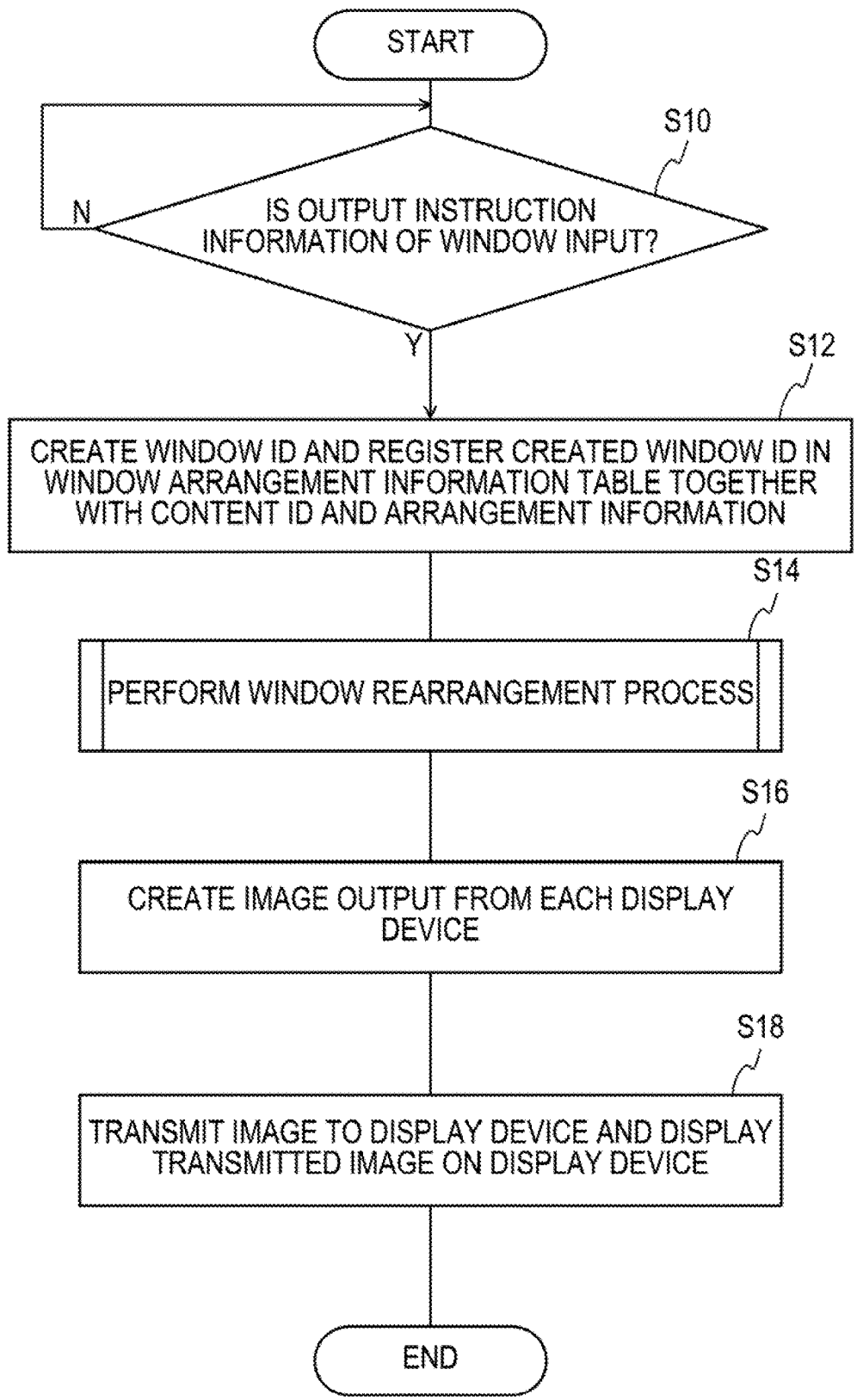
FIG. 9 is a flowchart (part 1) illustrating all processes of the information processing apparatus.
Figure 21:
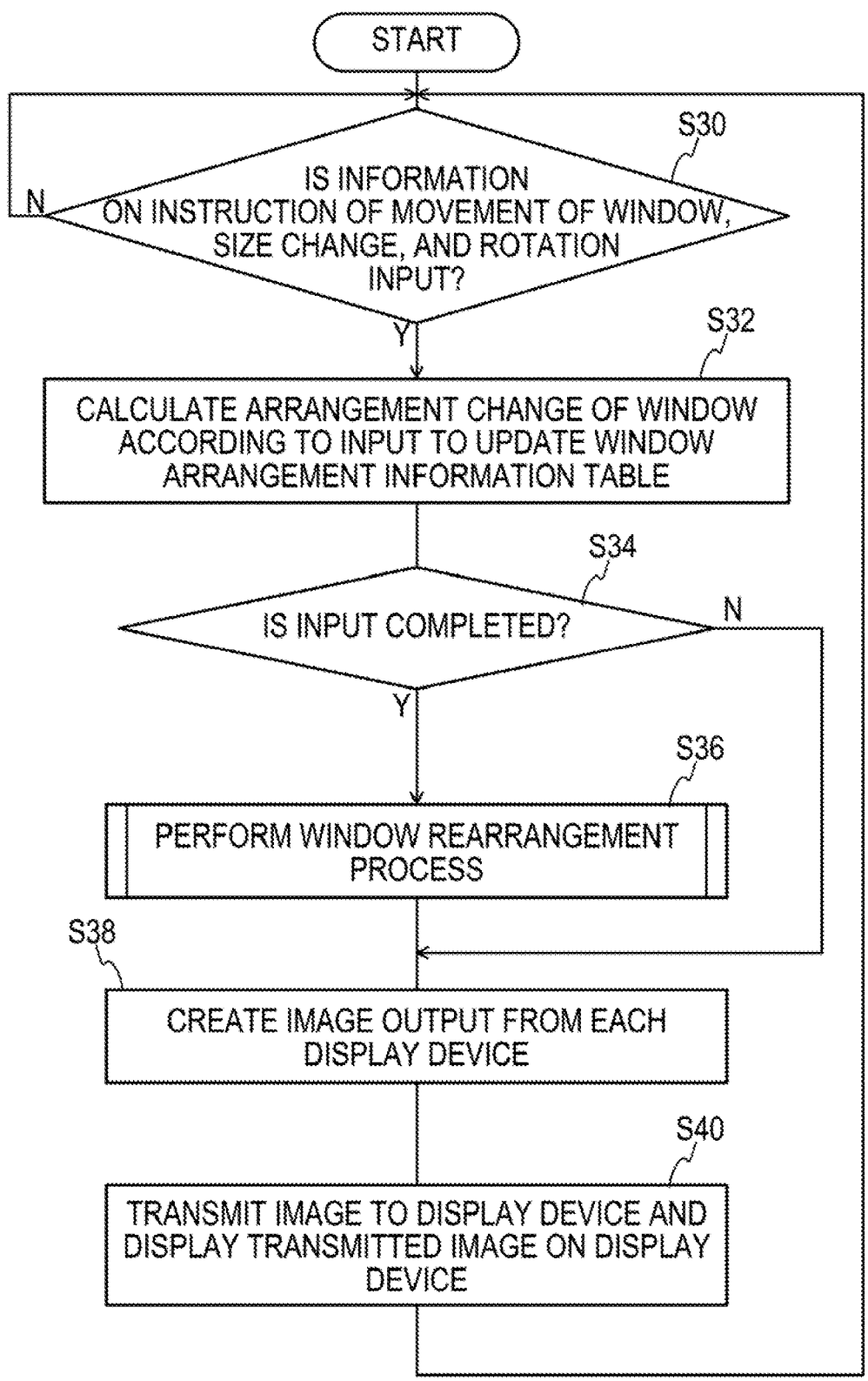
FIG. 21 is a flowchart (part 2) illustrating all processes of the information processing apparatus.

FIGS. 9 and 21 illustrate processes executed concurrently in the information processing apparatus 10. FIG. 9 illustrates a process executed when the user performs an operation of newly creating the window of the content, and FIG. 21 illustrates a process executed when the user performs an operation of moving an already displayed window.

(Process of FIG. 9)

First, the process of FIG. 9 will be described. In the process of FIG. 9, first, in step S10, the window creation/movement circuit 20 waits until information of an output instruction of the window is input from the input accepting circuit 86 of the display devices 80A to 80C. That is, when the user performs an operation to newly display the window by the touch operation, for example, when the user performs a touch operation to draw a predetermined figure (a triangle or the like), the determination of step S10 is positive, and as a result, the process proceeds to step S12.

When the process proceeds to step S12, the window creation/movement circuit 20 creates the window ID and registers the created window ID in the window arrangement information table 46 (see, e.g., FIG. 7B) together with the content ID and the arrangement information. The window creation/movement circuit 20 determines the arrangement information based on, for example, the position and the angle of the predetermined figure drawn by the user.

Next, in step S14, the rearrangement circuit 24 executes a window rearrangement process. The window rearrangement process is a process in which when the window is arranged based on the arrangement information registered in step S12, the window is moved (rearranged) to a position at which the window does not protrude in a case where the window protrudes from the connection screen region 182. Details of the window rearrangement process will be described later.

Next, in step S16, the drawing circuit 22 creates (draws) images to be output from the respective display devices 80A to 80C based on the window arrangement information table 46, the content DB 40, the display device information table 42, and the connection screen region information table 44.

Next, in step S18, the drawing circuit 22 transmits the images to the display devices 80A to 80C and displays the images in the respective screen regions 82A to 82C (connection screen region 182).

(Window Rearrangement Process)

Next, descriptions will be made in detail on the window rearrangement process executed by the rearrangement circuit 24 in step S14 according to the flowchart of FIG. 10 by referring to other drawings as appropriate. Here, as an example, descriptions will be made on a case where a window W is instructed to be displayed at a position (first position) at which the window W protrudes in the connection screen region 182 illustrated in FIG. 11A by the touch operation by the user.

Figure 10:
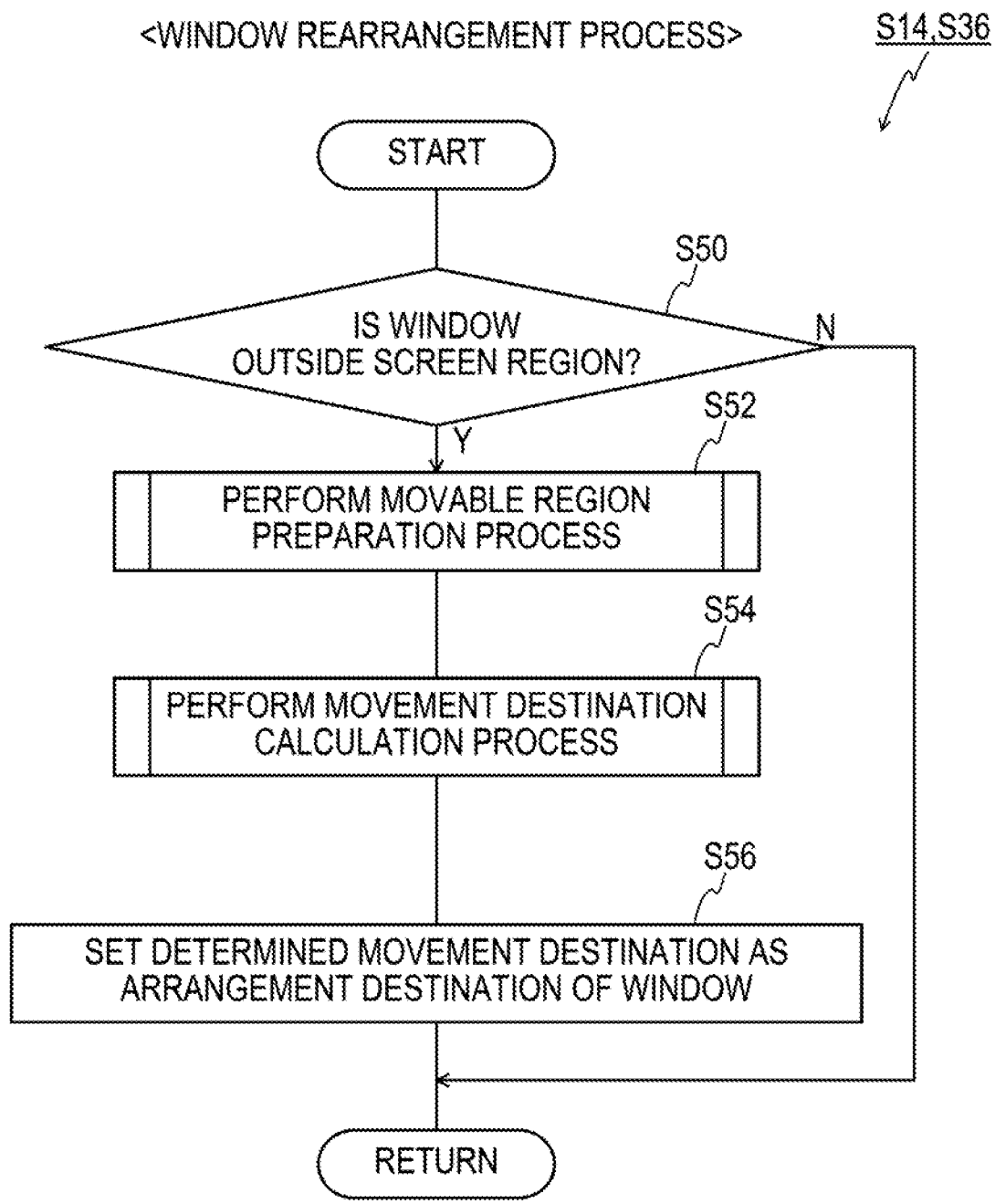
FIG. 10 is a flowchart illustrating detailed processes of step S14 of FIG. 9 and step S36 of FIG. 21.
Figure 11A:
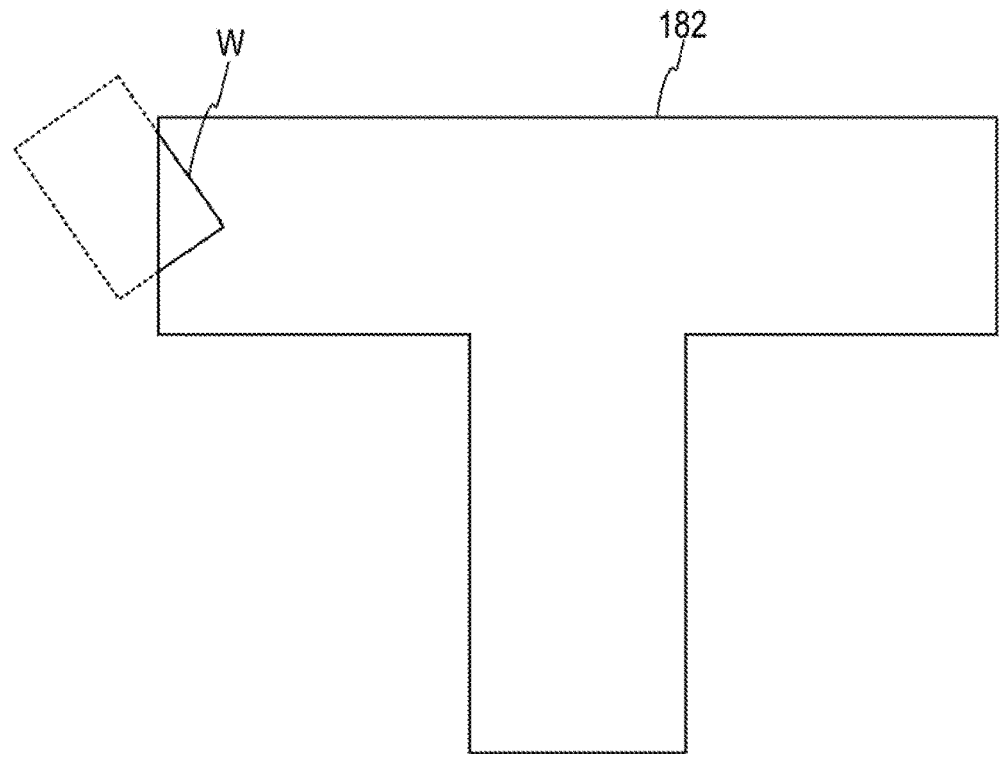
FIG. 11A is a diagram illustrating a state in which a window is projected in a screen region.

In the process of FIG. 10, first, in step S50, it is determined whether the window W is outside the connection screen region 182. As illustrated in FIG. 11A, when the window W protrudes from the connection screen region 182, the determination in step S50 is positive, and as a result, the process proceeds to step S52. In the meantime, when the window W is within the connection screen region 182, there is no need for rearrangement, so that the determination at step S50 is negative and then, all processes of FIG. 10 end and the process proceeds to S16 of FIG. 9.

As illustrated in FIG. 11A, when the window W protrudes from the connection screen region 182, and as a result, when the process proceeds to step S52, the rearrangement circuit 24 executes a movable region creation process. Specifically, the rearrangement circuit 24 executes the process according to the flowchart of FIG. 12.

(Movable Range Creation Process)

Figure 11B:
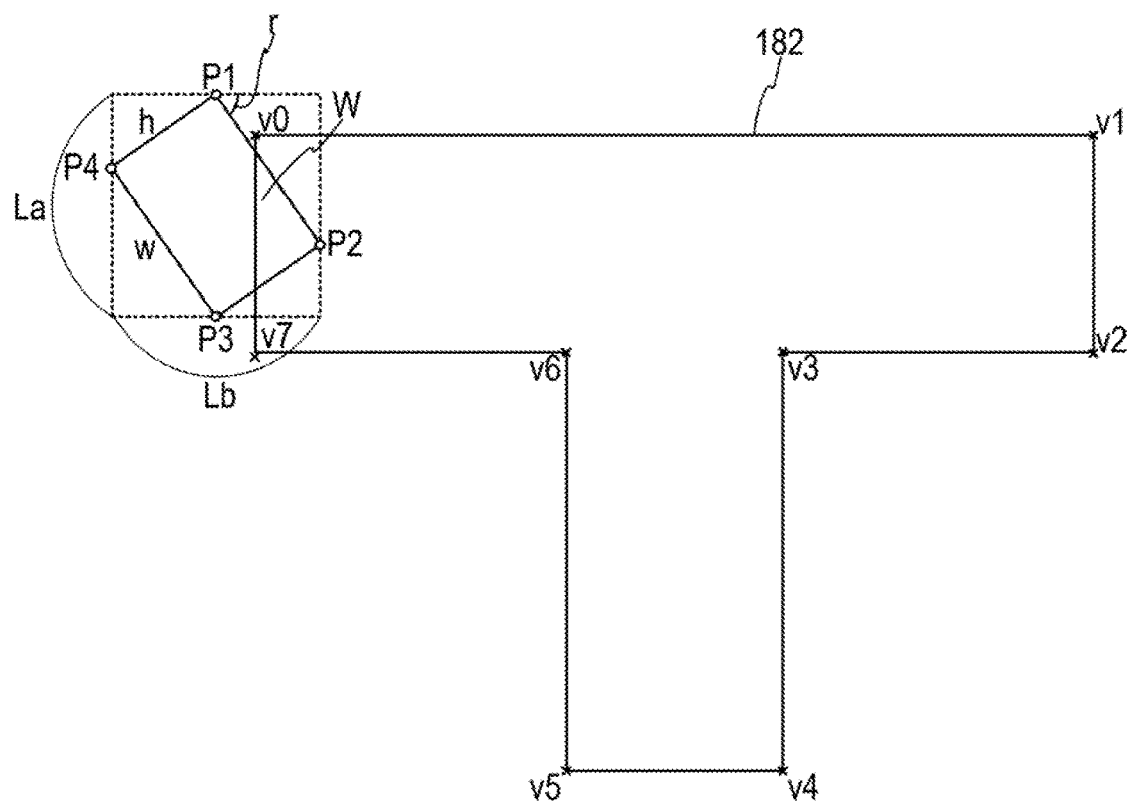
FIG. 11B is a diagram illustrating a coordinate and a dimension of the window or the screen region.
Figure 12:
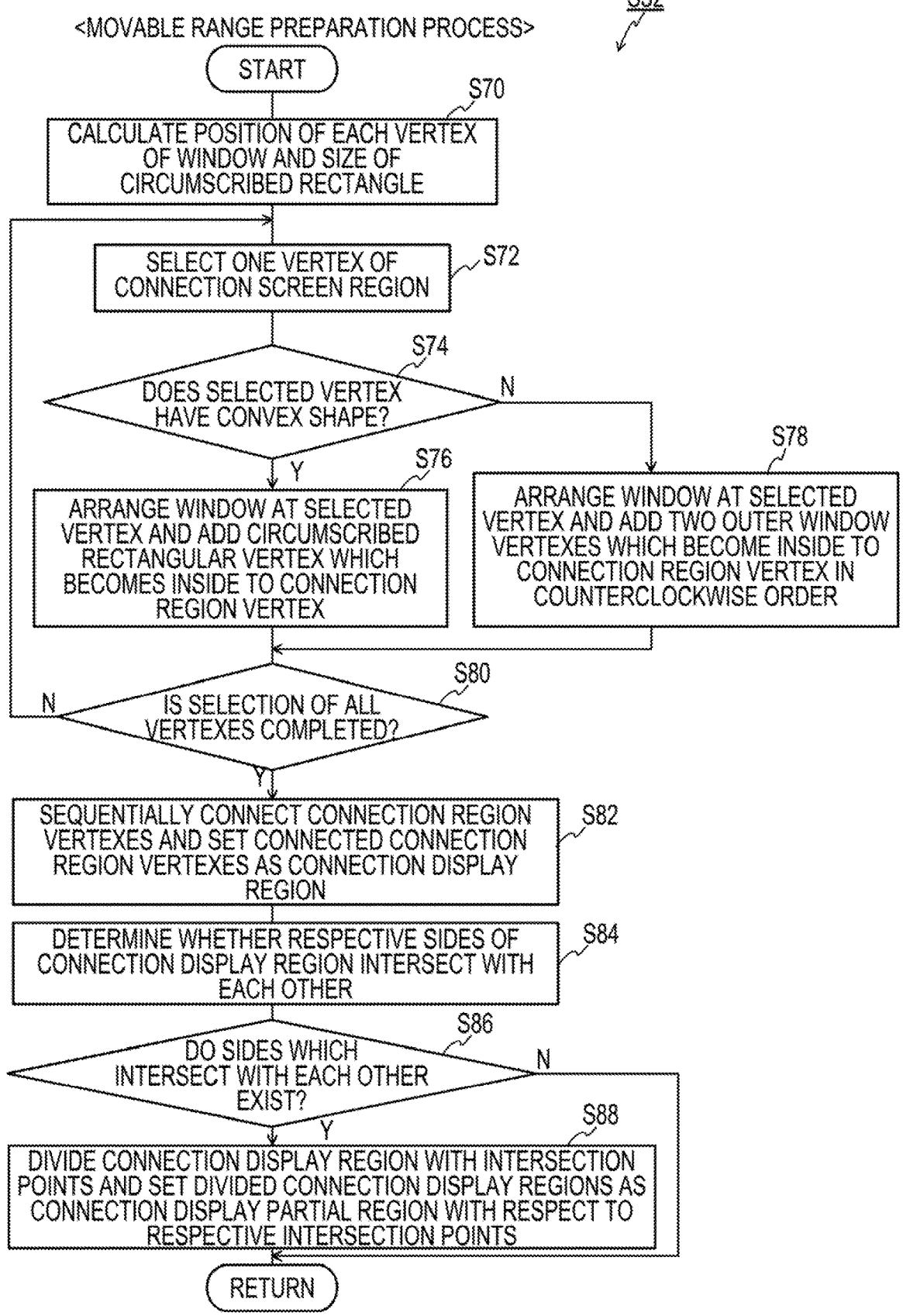
FIG. 12 is a flowchart illustrating detailed process of step S52 in FIG. 10.

In the process of FIG. 12, first, in step S70, the rearrangement circuit 24 calculates the position of each vertex of the window W and the size of a circumscribed rectangle. Here, the circumscribed rectangle means a rectangle having two sides that extend in the x-axis direction and two sides that extend in the y-axis direction circumscribing the window W. The rearrangement circuit 24 calculates coordinates of respective vertexes P1, P2, P3, and P4 of the window W illustrated in FIG. 11B and vertical and horizontal dimensions of the circumscribed rectangle represented by a broken line. For example, when the width of the window W is denoted by w, the height is denoted by h, and the rotational amount (rotation angle based on an x axis) is denoted by r, a vertical dimension La and a horizontal dimension Lb of the circumscribed rectangle may be obtained from Equations (1) and (2) below.

$$La = |h \cdot \cos r| + |w \cdot \sin r| \quad (1)$$

$$Lb = |w \cdot \cos r| + |h \cdot \sin r| \quad (2)$$

Next, in step S72, the rearrangement circuit 24 selects one vertex of the connection screen region 182. For example, the rearrangement circuit 24 selects the vertex v0 illustrated in FIG. 11B.

Figure 13:
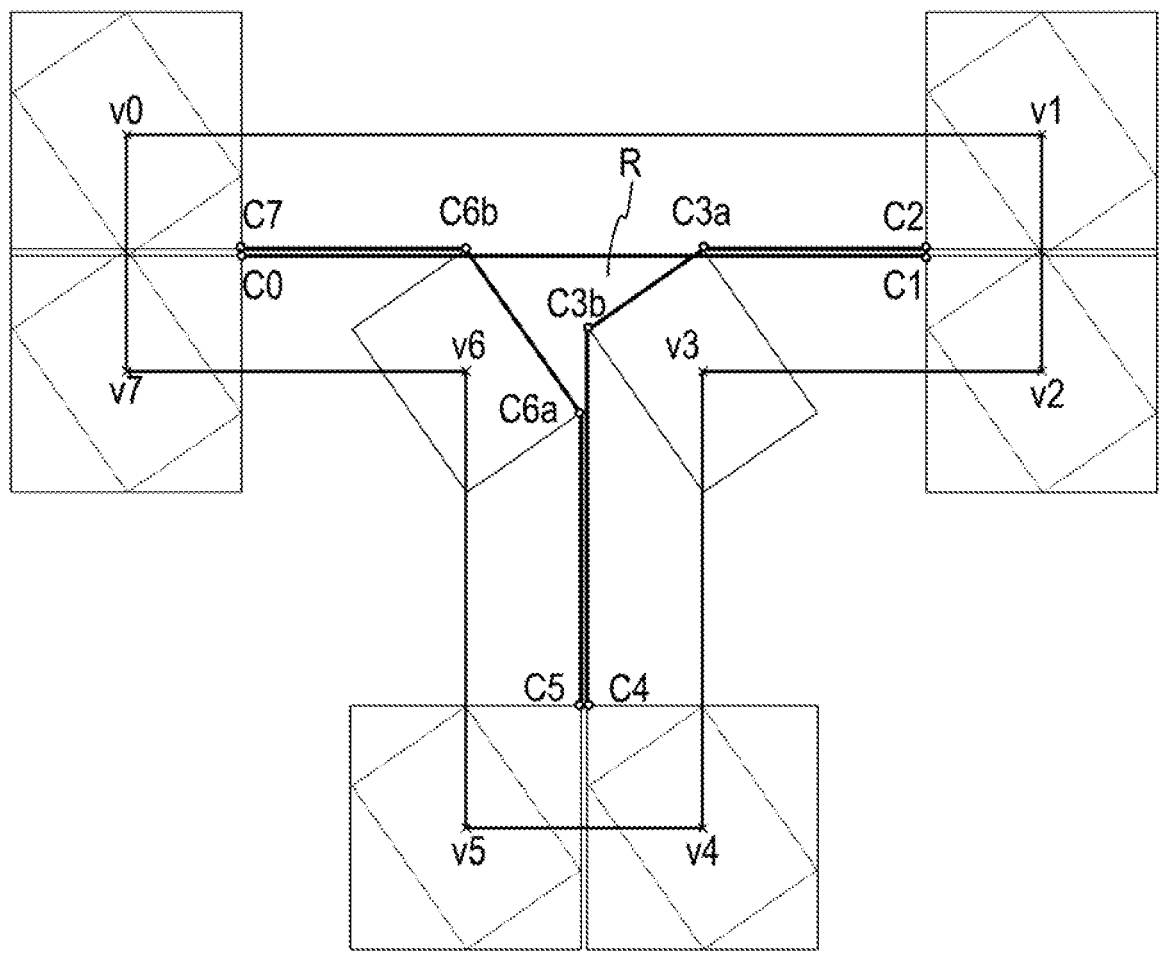
FIG. 13 is a diagram (part 1) for describing the process of FIG. 12.

Next, in step S74, the rearrangement circuit 24 determines whether the selected vertex has a convex shape. In this case, the rearrangement circuit 24 refers to the connection screen region information table 44 of FIG. 7A to determine whether the selected vertex v0 has the convex shape. When the determination in step S74 is positive, the process proceeds to step S76, and the rearrangement circuit 24 arranges the window W at the selected vertex and adds the vertex of the circumscribed rectangle that is the inside to a connection region vertex. When the selected vertex is the vertex v0, a circumscribed rectangle vertex C0 which is the inside is added as the connection region vertex as illustrated in FIG. 13. Further, the connection region vertex refers to a vertex that defines a connection display region (to be described later).

Next, in step S80, the rearrangement circuit 24 determines whether all vertexes have been selected. When the determination is negative, the rearrangement circuit 24 returns to step S72. Further, when the determination in step S74 is negative, that is, for example, when the vertex v3 having a concave shape illustrated in FIG. 11B is selected, the process proceeds to step S78. When the process proceeds to step S78, the rearrangement circuit 24 arranges the window W in the selected vertex v3 and adds two outer window vertexes which become the insides to the connection region vertex in a counterclockwise order. Specifically, vertexes C3a and C3b illustrated in FIG. 13 are added to the connection region vertex.

In the example of FIG. 13, vertexes C0, C1, C2, C3a, C3b, C4, C5, C6a, C6b, and C7 are sequentially added to the connection region vertex while repeating steps S72 to S80. As described above, the processes in steps S72 to S80 are repeatedly executed and when the determination in step S80 is positive, the rearrangement circuit 24 proceeds to step S82.

When the rearrangement circuit 24 proceeds to step S82, the rearrangement circuit 24 sequentially connects the connection region vertexes to form the connection display region. In the example of FIG. 13, a region surrounded by a bold solid line becomes a connection display region R.

Next, in step S84, the rearrangement circuit 24 determines whether the sides of the connection display region R intersect with each other. Next, in step S86, the rearrangement circuit 24 determines whether there are the sides which intersect with each other. When the determination is positive, the rearrangement circuit 24 proceeds to step S88 and when the determination is negative, the rearrangement circuit 24 terminates all processes of FIG. 12 without passing through step S88 and proceeds to step S54 of FIG. 10. Further, in the example of FIG. 13, since there are two places where the sides intersect with each other, the determination in step S86 is positive and the rearrangement circuit 24 proceeds to step S88.

When the rearrangement circuit 24 proceeds to step S88, the rearrangement circuit 24 divides the connection display region by intersection points with respect to the respective intersection points to set the divided connection display regions as a connection display circuit region. Further, in the example of FIG. 13, a region R1 indicated by hatching in FIG. 14A, a region R2 indicated by hatching, and a region R3 filled with a black color become the connection display circuit regions. In the embodiment, the connection display circuit regions R1 to R3 may be regions surrounded by a boundary line between a range through which the window W passes and a range through which the window W does not pass when the center of the window W is moved along an outer frame of the connection screen region 182. Further, the connection display circuit regions R1 and R2 are regions in which the direction when the vertexes are connected in an ascending order of the numbers of the vertexes becomes the counterclockwise direction. Such a region is particularly referred to as a "self-intersecting region".

After the above-described process of step S88 is executed, the rearrangement circuit 24 terminates all processes of FIG. 12 and proceeds to step S54 of FIG. 10.

Figure 14A:
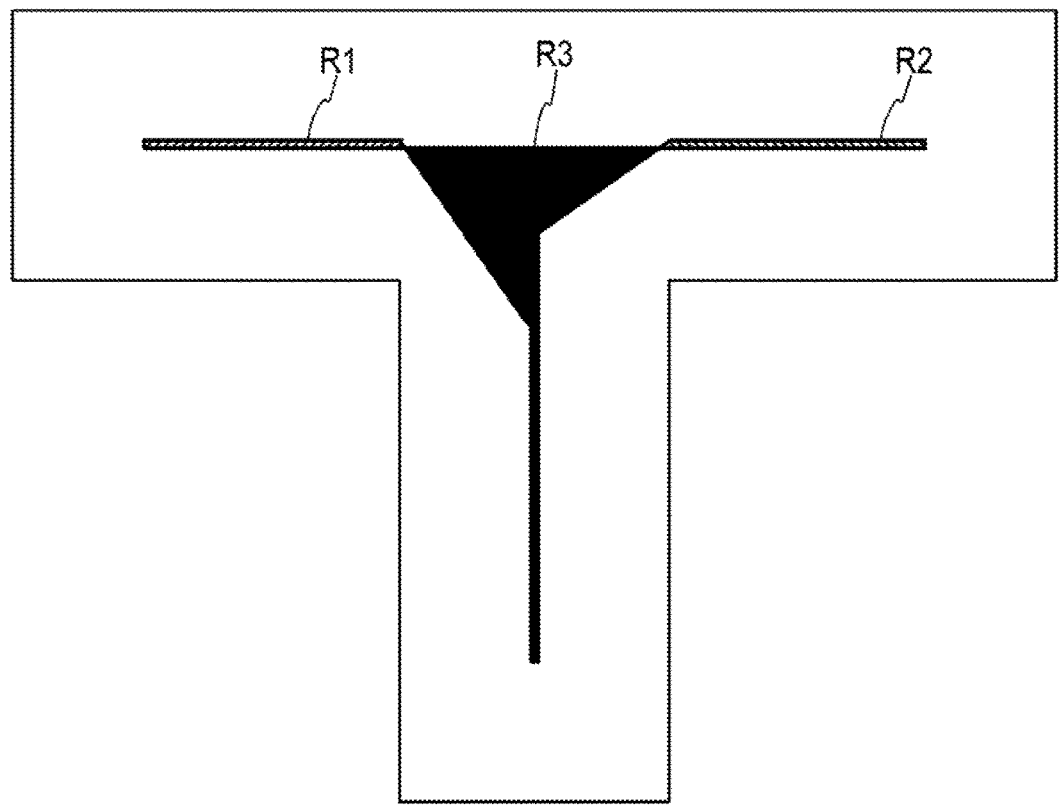
FIGS. 14A and 14B are diagrams (part 2) for describing the process of FIG. 12.
Figure 14B:
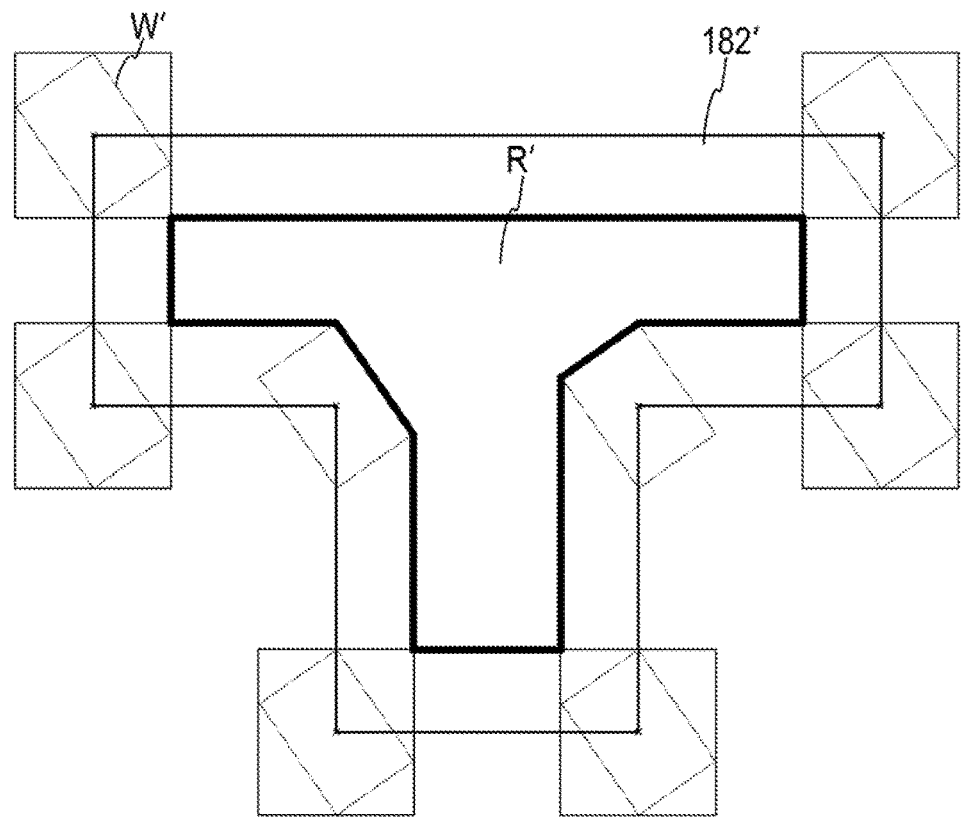

With respect to a connection screen region 182' illustrated in FIG. 14B, when a window W' is rearranged, sides of a connection display region R' do not intersect with each other. Therefore, in the case of the example of FIG. 14B, since the determination in step S86 is negative, the connection display circuit region is not created.

Referring back to FIG. 10, when the rearrangement circuit 24 proceeds to step S54, the rearrangement circuit 24 executes a movement destination calculation process. Specifically, the rearrangement circuit 24 executes the process according to the flowchart of FIG. 15.

(Movement Destination Calculation Process)

Figure 15:
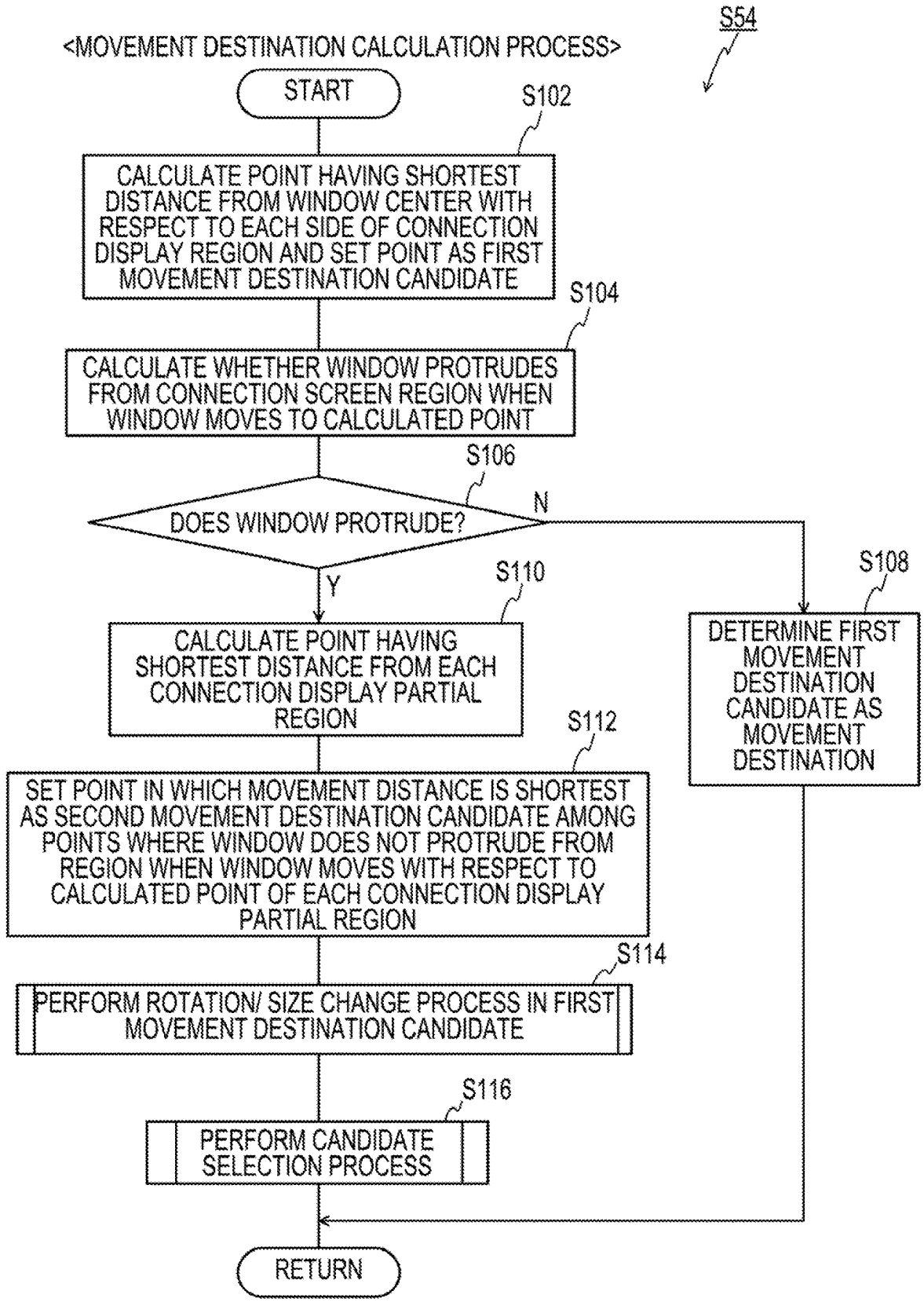
FIG. 15 is a flowchart illustrating a detailed process of step S54 in FIG. 10.

In step S102 of FIG. 15, the rearrangement circuit 24 calculates a point that is a shortest distance from the center of the window W for each side of the connection display region R and uses the point as a first movement destination candidate. When the position of the window W is the position of FIG. 11A, a point Q 1 illustrated in FIG. 16, which is closest to the center of the window W among the sides of the connection display region R, is the first movement destination candidate.

Next, in step S104, when the window W moves to the calculated point, the rearrangement circuit 24 calculates whether the window W protrudes from the connection screen region 182. In this case, the rearrangement circuit 24 may obtain whether the window W protrudes by calculation based on, for example, the position of the first movement destination candidate, the dimension of the window W, and the dimension of the connection screen region 182. Further, when it is known whether each connection display circuit region is the self-intersecting region, it may be determined that the window W protrudes from the connection screen region 182 when the first movement destination candidate is within the self-intersecting region.

Next, in step S106, the rearrangement circuit 24 determines whether the window W protrudes outside the connection screen region 182. When the determination in step S106 is negative, the process proceeds to step S108 and the rearrangement circuit 24 determines the first movement destination candidate as a movement destination of the window W. Thereafter, the rearrangement circuit 24 terminates all processes in FIG. 15 and proceeds to step S56 of FIG. 10. Further, in a case where the connection display circuit region is not created from the connection display region R' as illustrated in FIG. 14B, the determination of step S16 becomes negative.

In the meantime, when the determination in step S106 is positive, the process proceeds to step S110, and the rearrangement circuit 24 calculates a point which has the shortest distance from each connection display circuit region. For example, in the example of FIG. 16, points Q2 and Q3 of the connection display circuit regions R2 and R3 are obtained.

Figure 16:
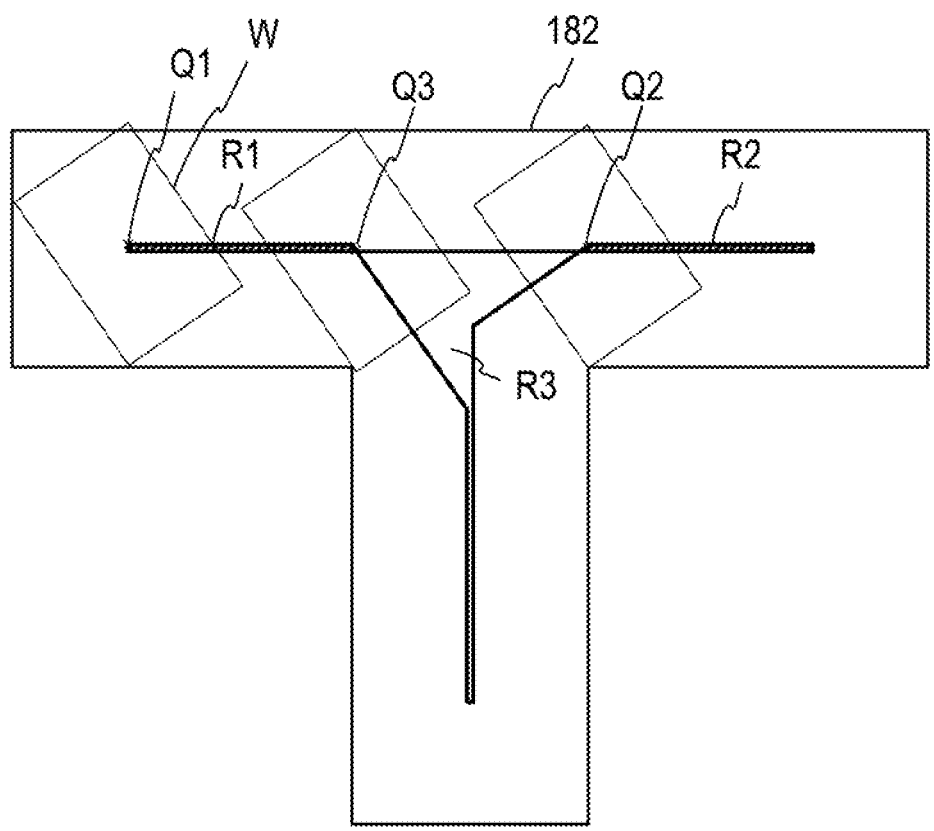
FIG. 16 is a diagram for describing the process of FIG. 15.

Next, in step S112, the rearrangement circuit 24 sets, as a second movement destination candidate, a point of which the movement distance is the shortest among points which do not protrude from the connection screen region 182 when the center of the window W moves with respect to the calculated points Q2 and Q3 of the respective connection display circuit regions. In the example of FIG. 16, when the center of the window W moves to the point Q2, the window W protrudes from the connection screen region 182 and when the window W moves to the point Q3, the window W does not protrude from the connection screen region 182. Therefore, the point Q3 becomes the second movement destination candidate. Further, in steps S110 and S112, when it is known whether each connection display circuit region is the self-intersecting region, a point which is closest to the center of the window W among connection display circuit regions which are not the self-intersecting regions may be set as the second movement destination candidate.

Next, when the process proceeds to step S114, the rearrangement circuit 24 executes a rotation/size change process in the first movement destination candidate. In step S114, the rearrangement circuit 24 executes the process according to the flowchart of FIG. 17.

(Rotation/Size Change Process in First Movement Destination Candidate)

Figure 17:
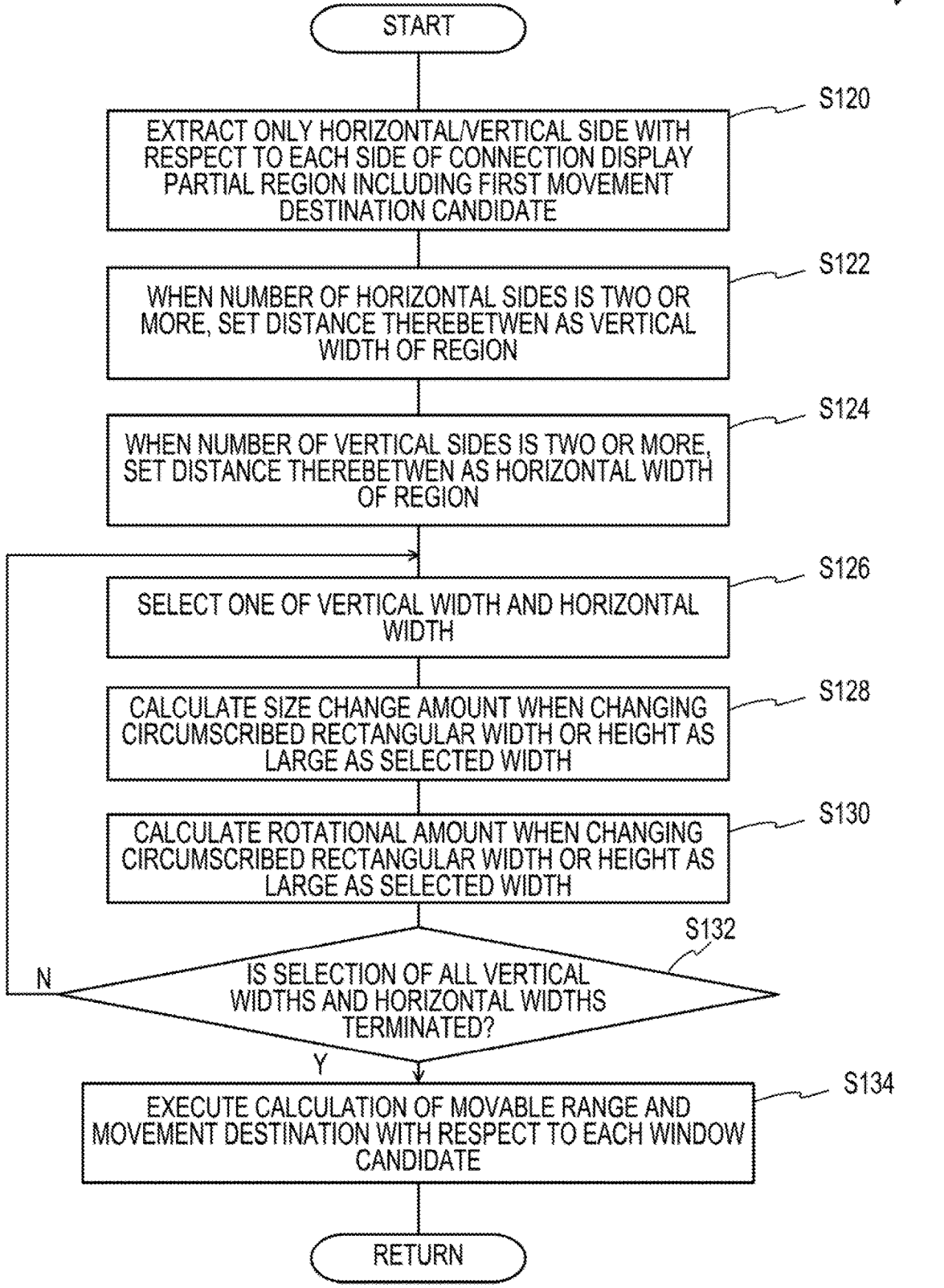
FIG. 17 is a flowchart illustrating detailed process of step S114 in FIG. 15.
Figure 18:
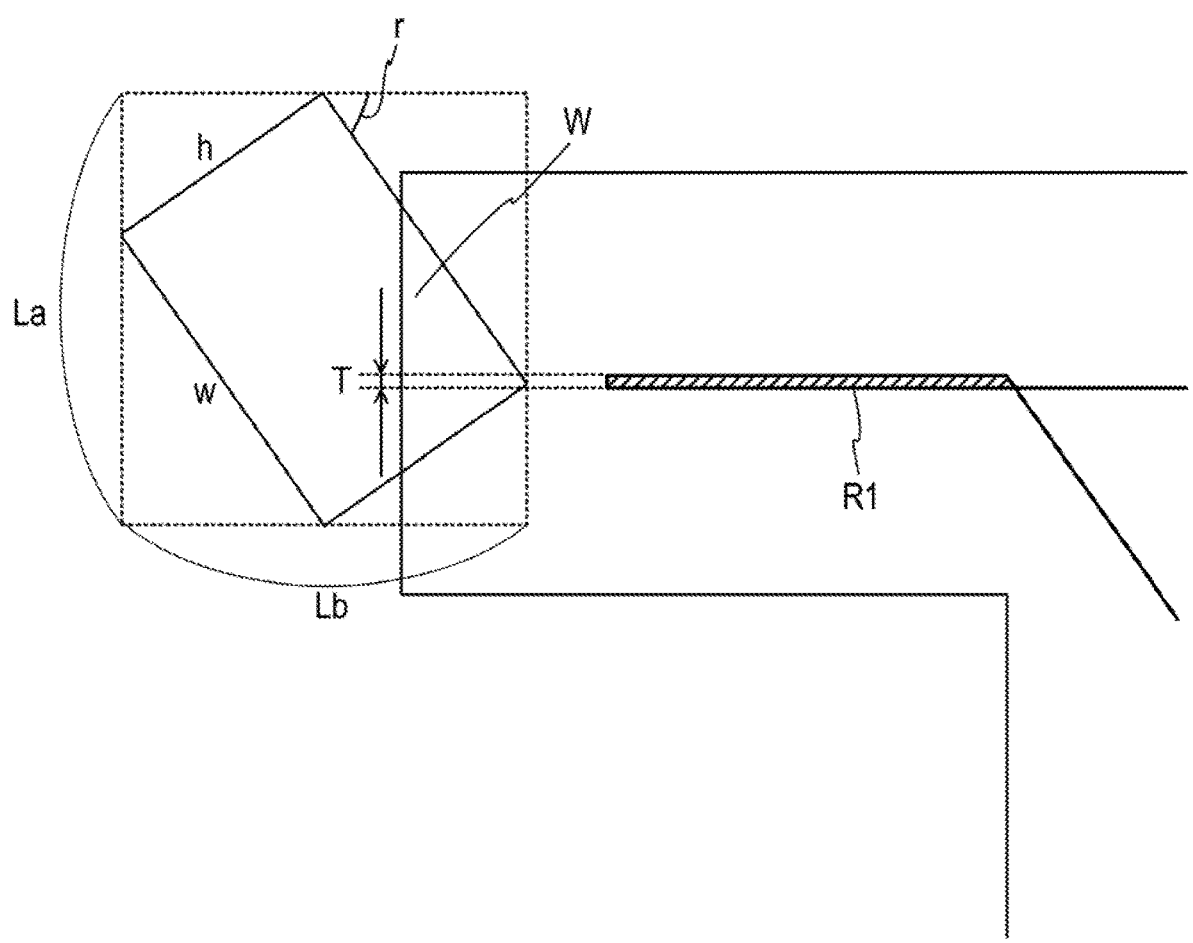
FIG. 18 is a diagram (part 1) for describing the process of FIG. 17.

In the process of FIG. 17, first, in step S120, the rearrangement circuit 24 extracts, for each side of the connection display circuit region including the first movement destination candidate, only a horizontal side (the side extending in the x-axis direction in FIG. 6) and a vertical side (the side extending in the y-axis direction in FIG. 6). FIG. 18 illustrates an enlarged diagram of a vicinity of the connection display circuit region R1. In the case of the example of FIG. 18, the upper and lower sides extending in the horizontal direction and the left side extending in the vertical direction in the connection display circuit region R1 are extracted.

Next, in step S122, when the number of horizontal sides is two or more, the rearrangement circuit 24 sets a distance therebetween as a vertical width of the region. In the example of FIG. 18, a distance T between the sides extending in the horizontal direction becomes the vertical width. Further, the vertical width T refers to a difference (protrusion amount) between a vertical dimension (La) of the window W (circumscribed rectangle) and a vertical width of a range where the connection display circuit region R1 of the connection screen region 182 exists.

Next, in step S124, when the number of vertical sides is two or more, the rearrangement circuit 24 sets a distance therebetween as a horizontal width of the region. Further, in the example of FIG. 18, it is assumed that since there is only one side extending in the vertical direction, there is no horizontal width.

Next, in step S126, the rearrangement circuit 24 selects one of the vertical width and the horizontal width. In the example of FIG. 18, the vertical width T is selected. Next, in step S128, the rearrangement circuit 24 calculates a size change amount (reduction magnification) when changing the width or height of the circumscribed rectangle by the selected width (here, the vertical width T). Further, here, it is assumed that an aspect ratio of the window W is maintained. In this case, when the vertical width of the circumscribed rectangle after the size change is (La−T) and the reduction magnification is a, a satisfying Equation (3) below may be obtained.

$$La-T=|ah\cdot\cos r|+|aw\cdot\sin r| \quad (3)$$

The width of the window after the size change is denoted by aw and the height is denoted by ah.

Next, in step S130, the rearrangement circuit 24 calculates the rotational amount when changing the width or height of the circumscribed rectangle by the selected width (here, the vertical width T). In this case, an angle r' satisfying Equation (4) below is obtained.

$$La-T=|h\cdot\cos r'|+|w\cdot\sin r'| \quad (4)$$

An absolute value |r−r'| of a difference between the angles r and r' is set to the rotational amount N when changing the width or the height of the circumscribed rectangle. Further, r' may not be obtained (may have no solution).

Next, in step S132, the rearrangement circuit 24 determines whether selection of all vertical widths and horizontal widths ends. When the determination herein is negative, the process returns to step S126, but when the determination is positive, the process proceeds to step S134.

Figure 19A:
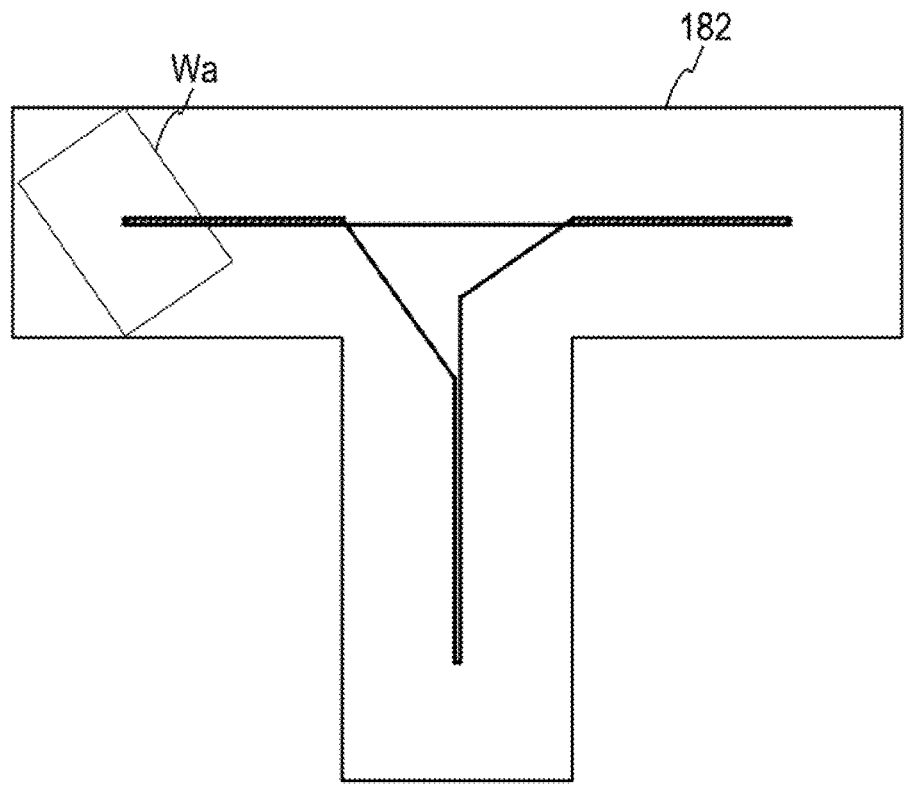
FIGS. 19A and 19B are diagrams (part 2) for describing the process of FIG. 17.
Figure 19B:
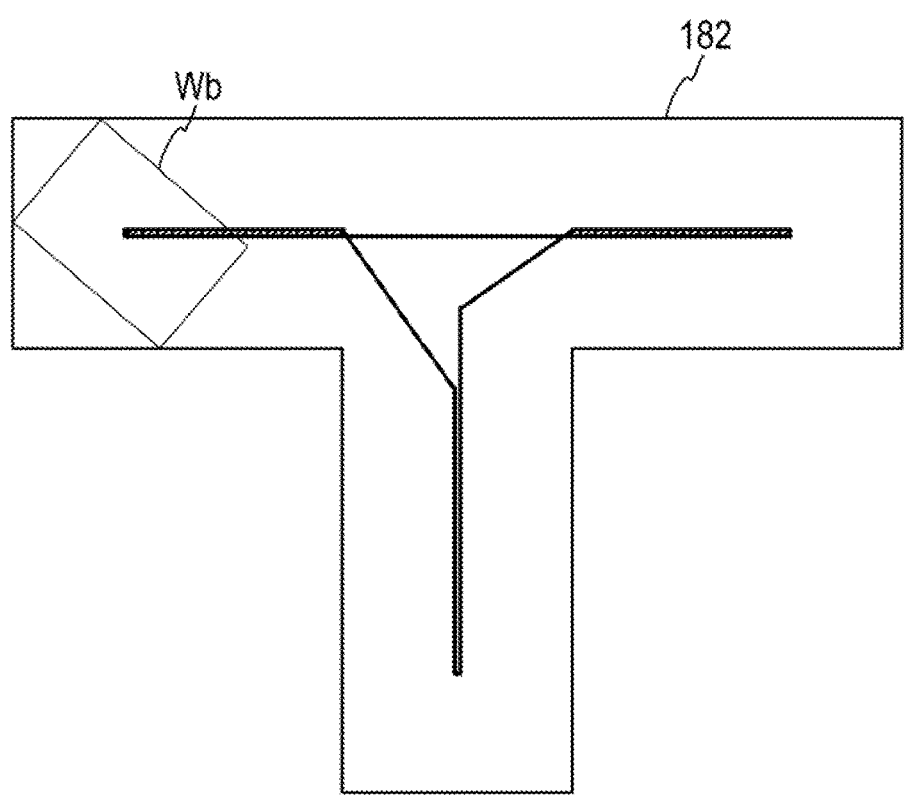

When the determination in step S132 is positive, and as a result, the process proceeds to step S134, the rearrangement circuit 24 performs a process of calculating the movable range and the movement destination for each window candidate (the window after the size change or the window after the angle change). In this case, among respective sides of the movable range, which are obtained by executing the same process as step S52 (FIG. 12) described above by using each window candidate, the point closest to the window candidate is determined as the movement destination candidate. Further, when the determined point is outside the connection display region R (FIG. 13), the point is assumed to be excluded from the movement destination candidate. Thereafter, the process proceeds to step S116 of FIG. 15. Further, FIG. 19A illustrates a state in which a window Wa after the size change moves to the movement destination candidate, and FIG. 19B illustrates a state in which a window Wb after rotation moves to the movement destination candidate.

When the process proceeds to step S116 in FIG. 15, the rearrangement circuit 24 executes a candidate selection process. In step S116, the rearrangement circuit 24 executes the process according to the flowchart of FIG. 20.

(Candidate Selection Process)

Figure 20:
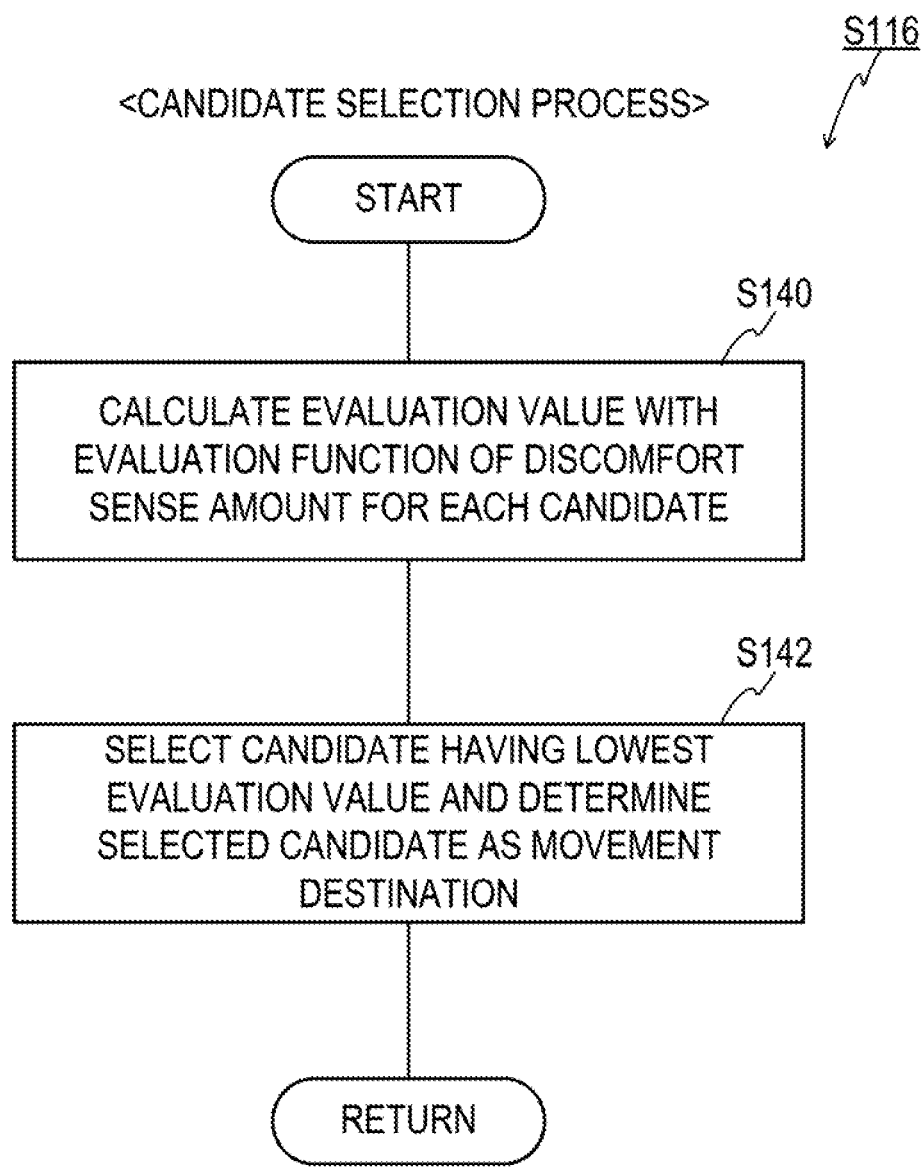
FIG. 20 is a flowchart illustrating a detailed process of step S16 in FIG. 15.

In the process of FIG. 20, first, in step S140, the rearrangement circuit 24 calculates an evaluation value with an evaluation function of a discomfort sense amount for each candidate. The candidate in this case is the movement destination candidate when the size of the window is changed in the first movement destination candidate, a movement destination candidate when the window is rotated in the first movement destination candidate, and the second movement destination candidate. In step S140, a value (evaluation value) of an evaluation function f is obtained for each candidate. The evaluation function f is represented by Equation (5) below as an example.

$$F = U + \alpha S + \beta N \quad (5)$$

Here, U denotes the movement distance of the window, S denotes a size change amount, and N denotes the rotational amount. The size change amount S is represented by Equation (6) below and the rotational amount N is represented by Equation (7).

$$S = (h - ah) + (w - aw) \quad (6)$$

$$N = |r - r'| \quad (7)$$

Coefficients α and β of Equation (5) above are predefined in the content DB 40 of FIG. 5. In addition, in FIG. 5, a value of the coefficient α of the size change and the coefficient β of the rotational amount are defined for each type of content. When the value of α is large, it indicates that adjusting the size of the window is not desired to be performed as much as possible and when the value of β is large, it indicates that adjusting the rotation of the window is not desired to be performed as much as possible. Further, the values of α and β may be set by the user or an administrator. For example, when the movement distance is preferably short (the rotation or size change is not concerned), α and β may be set to 0. Further, when the size change or rotation is never allowed, α or β may be set to ∞.

Next, in step S142, the rearrangement circuit 24 selects a candidate having a lowest value (evaluation value) of the evaluation function f and determines the candidate as the movement destination. When the process of FIG. 20 ends as described above, the process (step S54) of FIG. 15 also ends and the process proceeds to step S56 of FIG. 10.

Referring back to FIG. 10, when the process proceeds to step S56, the rearrangement circuit 24 sets the movement destination determined in step S108 of FIG. 15 or step S142 of FIG. 20 as an arrangement destination of the window. In this case, the rearrangement circuit 24 updates the window arrangement information table 46 with information on a newly determined arrangement destination of the window. Thereafter, the process proceeds to step S16 of FIG. 9.

When the window arrangement information table 46 is updated in step S56, the drawing circuit 22 creates (draws) the images to be output from the respective display devices 80A to 80C based on the updated window arrangement information table 46. Thus, even when a position at which the user instructs display of the window is not appropriate (the position is a position where the window protrudes from the connection screen region 182), the window may be displayed at an appropriate position (a position where the window does not protrude). In this case, since the window is displayed in a position/state where the value of the evaluation function f is the smallest, it is possible to reduce the sense of discomfort which the user feels with respect to the display of the window.

In the case where the size of the window is changed in step S128, it is possible to allow the change of the aspect ratio of the window. When the aspect ratio is allowed to be changed, the size may be changed so that, for example, a long side of the window is contracted when the size is changed. Further, information on whether to permit the change of the aspect ratio may be stored in the content DB 40 of FIG. 5. Hereinafter, an example of the size change in the case of allowing the change of the aspect ratio will be described.

For example, as illustrated in FIG. 18, when the width w is larger than the height h, the rearrangement circuit 24 solves Equation (8) below to obtain the reduction magnification a.

$$La - T = |h \cdot \cos r| + |aw \cdot \sin r| \quad (8)$$

Then, the rearrangement circuit 24 may reduce the width w by the reduction magnification a and display the window. In this case, a size change amount S used to obtain the value of the evaluation function f in Equation (5) above is expressed by Equation (9) below.

$$S = w - aw \quad (9)$$

On the contrary, when the width w is smaller than the height h, the rearrangement circuit 24 solves Equation (10) below to obtain the reduction magnification a.

$$La - T = |ah \cdot \cos r| + |w \cdot \sin r| \quad (10)$$

Then, the rearrangement circuit 24 may reduce the height h by the reduction magnification a and display the window. In this case, a size change amount S used to obtain the value of the evaluation function f in Equation (5) above is expressed by Equation (11) below.

$$S = h - ah \quad (11)$$

When the width w and the height h are equal, a method (Equation (6) above) of maintaining the aspect ratio may be used.

(Process of FIG. 21)

Next, the process of FIG. 21 executed in parallel with the process of FIG. 9 will be described.

In the process of FIG. 21, first, in step S30, the window creation/movement circuit 20 waits until information of movement of the window, the size change, an instruction of rotation is input. That is, when the user moves the window W already displayed in the connection screen region 182 by the touch operation, the determination in step S30 becomes positive, and as a result, the process proceeds to step S32.

When the process proceeds to step S32, the drawing circuit 22 calculates the arrangement change of the window according to the input and updates the window arrangement information table 46 (FIG. 7B).

Next, in step S34, the drawing circuit 22 determines whether the input is completed. That is, the drawing circuit 22 determines whether information indicating that the user terminates the touch operation of movement, size change, or rotation is accepted from the input accepting circuit 86.

When the determination in step S34 is negative, in steps S38 and S40, the display of the movement of the window or while the window is being moved is executed in the same manner as steps S16 and S18 described above. Specifically, in step S38, the drawing circuit 22 creates the images (images while the window is being moved) to be output from the respective display devices 80A to 80C based on the window arrangement information table 46, etc. Then, in step S40, the drawing circuit 22 transmits the images to the display devices 80A to 80C and displays the images. Thereafter, the process returns to step S30. Further, until the determination at step S34 is positive, that is, until the input by the user is completed, a state in which the window is being moved in accordance with the touch operation by the user is displayed.

In the meantime, when the determination in step S34 is positive, the process proceeds to step S36 and the rearrangement circuit 24 executes the window rearrangement process. Further, the window rearrangement process of step S36 is similar to the process (FIG. 10) of step S14 described above. Thus, even when a position at which the window is displayed after movement is not appropriate (the position is a position where the window protrudes from the connection screen region 182), the window is rearranged at an appropriate position (a position where the window does not protrude). In this case, since the window is displayed in a position/state where the value of the evaluation function f is the smallest, it is possible to reduce the sense of discomfort which the user feels with respect to the display of the window.

As can be seen from the above description, the rearrangement circuit 24 of the embodiment implements functions as a specific circuit that specify the connection display circuit regions R1 to R3, a determination circuit that determines the first movement destination candidate, and an arrangement circuit that arranges the window based on the first movement destination candidate.

As described in detail above, according to the embodiment, when the rearrangement circuit 24 detects that the window W has protruded or protrudes from the connection screen region 182 (Yes in S50), the rearrangement circuit 24 specifies a region (connection display circuit regions R1 to R3) surrounded by a boundary line between a range through which the window W passes and a range through which the window W does not pass when the center of the window W is moved along the outer frame of the connection screen region 182 (S82 to S88 in FIG. 12). Further, the rearrangement circuit 24 sets the position closest to the position of the window W among the connection display circuit regions R1 to R3 as the first movement destination candidate (S102 in FIG. 15). In addition, when the window W is arranged in the first movement destination candidate, the rearrangement circuit 24 determines the first movement destination candidate as the movement destination of the window W when the window W does not protrude from the connection screen region 182 (S108 of FIG. 15). In the meantime, when the window W protrudes from the connection screen region 182, the rearrangement circuit 24 changes the angle and/or the size of the window W based on the protrusion amount and then arranges the window W in the vicinity of the first movement destination candidate or arranges the window W at the position closest to the position of the window W in the connection display circuit region R3 where the window W does not protrude from the connection screen region 182 (5110 to S116 in FIG. 15). As described above, in the case where the position closest to the window W among the connection display circuit regions R1 to R3 is set as the first movement destination candidate, when the window W may be arranged as it is, the window W is arranged as it is and when the window W protrudes, the window W is arranged by rotating the window W or changing the size thereof or the window W is arranged at a position at which the window W may be arranged without rotation or size change. As a result, the window W may be rearranged so as reduce the sense of discomfort felt by the user.

Here, a comparative example will be described. FIG. 22A to FIG. 22F are diagrams for describing the comparative example and are diagrams illustrating a position at which the window W is rearranged by a process called a morphology operation. In the process, as illustrated in FIGS. 22A to 22E, when the window W protrudes from the connection screen region 182, the center of the window W is moved along a side (outer periphery) of the connection screen region 182. In addition, a part (pixel) through which the window W passes while moving is fully painted (see, e.g., gray parts of FIGS. 22A to 22E).

Figure 22A:
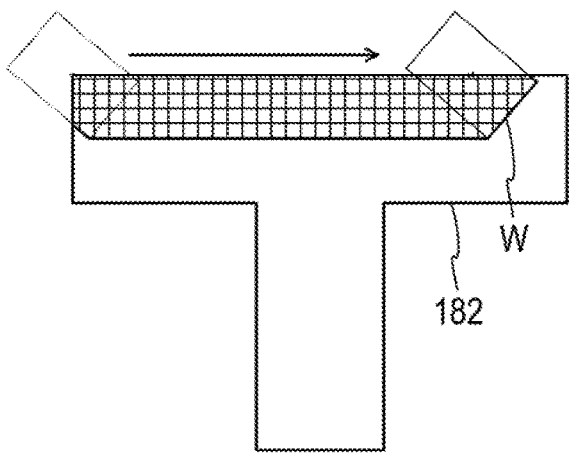
FIG. 22A to FIG. 22F are diagrams illustrating a method for obtaining a position at which the window is rearranged by a morphology operation.
Figure 22B:
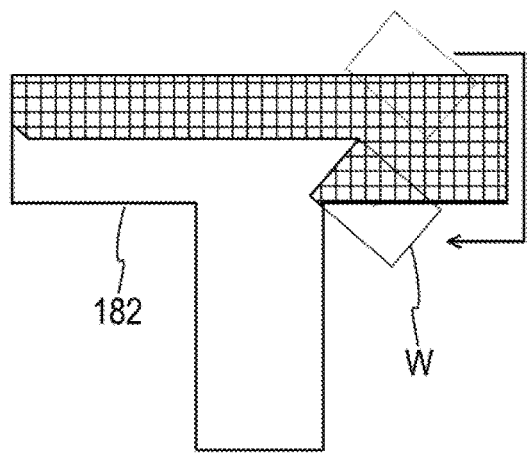
Figure 22C:
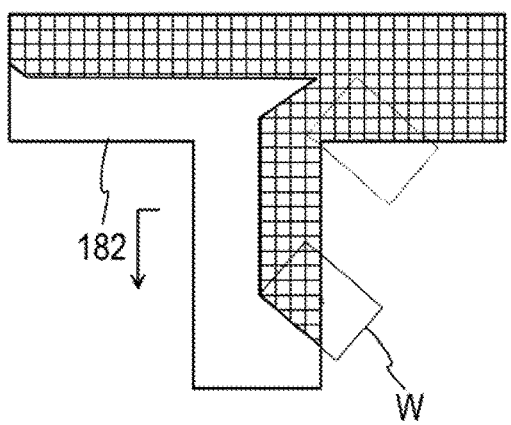
Figure 22D:
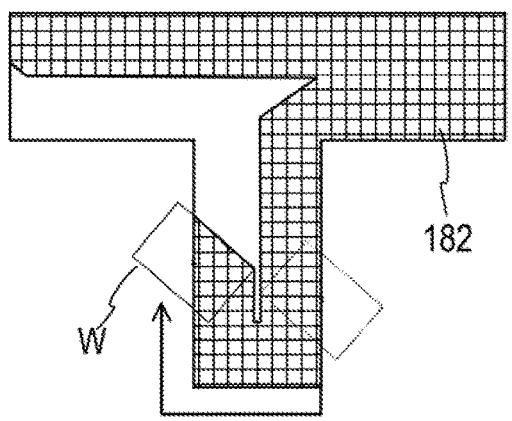
Figure 22E:
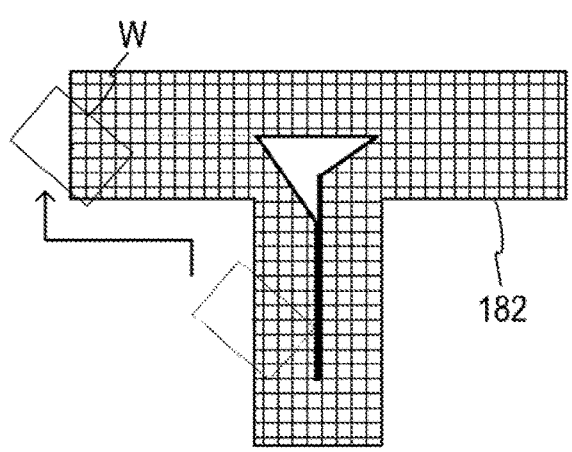
Figure 22F:
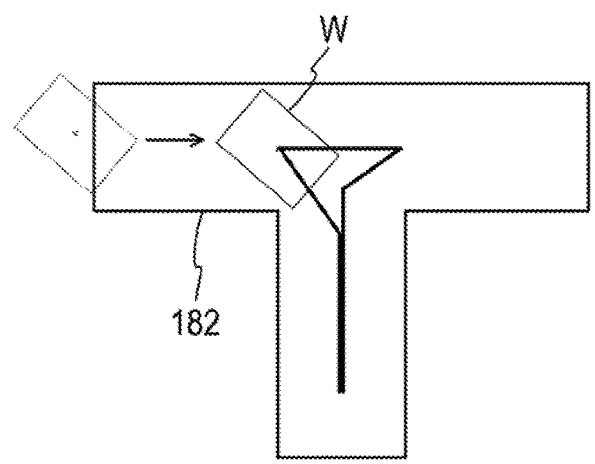

When the window W makes one round around the outer periphery of the connection screen region 182 and the full painting is completed, an unpainted region remains (see, e.g., FIG. 22E). The region means a region where the window W does not protrude from the connection screen region 182 even when the center of the window W is arranged in the corresponding region. In the comparative example, as illustrated in FIG. 22F, the center of the window may be arranged at the position closest to the window W among the regions.

In a method using the morphology operation, it is necessary to perform a full painting process of the pixel, so that calculation according to the number of pixels is required. As a result, it takes time to perform calculation and a throughput may increase. In the meantime, in the embodiment, since the full painting of the pixel is not required, and as a result, the throughput may be reduced. In addition, in the example of FIG. 22F, since the movement to the connection display circuit region R1 described in the embodiment is not allowed, the movement distance may become longer. As a result, a user who operates the window may store the sense of discomfort with respect to the rearrangement of the window. In the meantime, in the embodiment, as described above, by allowing rotation and size change of the window, it is possible to reduce the movement distance at the time of rearrangement, so that it is possible to reduce the sense of discomfort given to the user.

In the embodiment, it is assumed that the rearrangement circuit 24 rearranges the window W so that evaluation values based on the movement distance of the window W, a change amount of the angle, and the size change amount are smallest when the window protrudes from the connection screen region 182. As a result, the window W may be rearranged at a position where the sense of discomfort of the user may be suppressed to the minimum.

In the embodiment, the users may change weights (coefficients) of the movement distance of the window, the change amount of the angle, and the size change amount in the evaluation function f. As a result, when the window is rearranged, preferences of the users may be reflected.

In the embodiment, the content DB 40 manages the coefficient of the evaluation function f for each type of content displayed in the window. As a result, the rearrangement of the window without the sense of discomfort may be implemented according to the content.

In the embodiment, when the angle or size of the window is changed, since the change amount of the angle or size is determined based on the dimension of the connection display circuit region R1, an appropriate change amount may be obtained by simple calculation.

In the embodiment, descriptions have been made on a case where Equation (5) above is used as the evaluation function f, but the present disclosure is not limited thereto. That is, other evaluation functions may be used instead of the evaluation function f of Equation (5) above.

In the embodiment, descriptions have been made on a case where the connection screen region 182 has a shape illustrated in FIG. 2, but the present disclosure is not limited thereto. That is, the connection screen region 182 may have a shape in which the rectangle is combined. Further, in the embodiment, descriptions have been made on a case where the display devices 80A, 80B, etc. include the projector as the screen display circuit 84, but the present invention is not limited thereto and the display devices 80A, 80B, etc. may include a display such as a liquid crystal display as the screen display circuit 84.

When distributing a program, the program is sold, for example, in the format of a portable recording medium such as a digital versatile disc (DVD) and a compact disc read only memory (CD-ROM) in which the program is recorded. Further, the program may be stored in a storage device of a server computer and the program may be transferred from the server computer to another computer via a network.

The computer that executes the program stores, for example, the program recorded in the portable storage medium or the program transferred from the server computer in the storage device thereof. In addition, the computer reads the program from the storage device thereof and executes the process according to the program. Further, the computer may read the program directly from the portable storage medium and execute the process according to the program. In addition, each time the program is transferred from a server computer, the computer may gradually execute the process according to the received program.

All examples and conditional language recited herein are intended for pedagogical purposes to aid the reader in understanding the disclosure and the concepts contributed by the inventor to furthering the art, and are to be construed as being without limitation to such specifically recited examples and conditions, nor does the organization of such examples in the specification relate to a showing of the superiority and inferiority of the disclosure. Although the embodiment(s) of the present disclosure has (have) been described in detail, it should be understood that the various changes, substitutions, and alterations could be made hereto without departing from the spirit and scope of the disclosure.

What is claimed is:

1. An information processing apparatus comprising:
   a memory; and
   a processor coupled to the memory and configured to:
      specify one or a plurality of regions surrounded by a boundary line between a range through which a rectangular window passes and a range through which the window does not pass as an arrangement candidate region of the window in a display region when a center of the window is moved according to an outer frame of the display region in a case where it is detected that a display position of the window is a first position at which the window protrudes from the display region,
      determine a position closest to the first position as an arrangement candidate position of the window among one or a plurality of arrangement candidate regions, and
      arrange the center of the window at the arrangement candidate position when the window does not protrude from the display region in a case where the arrangement candidate position and the center of the window match each other, arrange the center of the window at the position closest to the first position at which the window does not protrude from the display region after changing an angle and/or a size of the window based on a protrusion amount when the window protrudes from the display region, or arrange the center of the window at the position closest to the first position at which the window does not protrude from the display region without changing the angle and the size of the window.

2. The information processing apparatus according to claim 1,
   wherein the processor is configured to arrange the window so that evaluation values based on a movement distance of the window, a change amount of the angle, and a change amount of the size becomes smallest when the window protrudes from the display region.

3. The information processing apparatus according to claim 2,
   wherein weights of the movement distance of the window, the change amount of the angle, and the change amount of the size are variable, when the evaluation value is calculated.

4. The information processing apparatus according to claim 3,
   wherein the weights are determined according to a type of content displayed in the window.

5. The information processing apparatus according to claim 1,
   wherein when the angle or size of the window is changed, the processor determines the change amount of the angle or the change amount of the size based on the dimension of the arrangement candidate region including the arrangement candidate position.

6. The information processing apparatus according to claim 1,
   wherein the display region has a shape in which a rectangle is combined.

7. A display system comprising:

a display configured to display a screen including a rectangular window in a display region; and an information processing apparatus configured to create the screen and display the created screen in the display, wherein the information processing apparatus includes, a memory, and a processor coupled to the memory and configured to:

specify one or a plurality of regions surrounded by a boundary line between a range through which the window passes and a range through which the window does not pass as an arrangement candidate region of the window when a center of the window is moved according to an outer frame of the display region in a case where it is detected that a display position of the window is a first position at which the window protrudes from the display region, determine a position closest to the first position as an arrangement candidate position of the window among one or a plurality of arrangement candidate regions, and arrange the center of the window at the arrangement candidate position when the window does not protrude from the display region in a case where the arrangement candidate position and the center of the window match each other, arrange the center of the window at the position closest to the first position at which the window does not protrude from the display region after changing an angle and/or a size of the window based on a protrusion amount when the window protrudes from the display region, or arrange the center of the window at the position closest to the first position at which the window does not protrude from the display region without changing the angle and the size of the window.

8. A non-transitory computer-readable recording medium storing a program that causes a processor included in an information processing apparatus to execute a process, the process comprising:

specifying one or a plurality of regions surrounded by a boundary line between a range through which a rectangular window passes and a range through which the window does not pass as an arrangement candidate region of the window in a display region when a center of the window is moved according to an outer frame of the display region in a case where it is detected that a display position of the window is a first position at which the window protrudes from the display region;

determining a position closest to the first position as an arrangement candidate position of the window among one or a plurality of arrangement candidate regions; and arranging the center of the window at the arrangement candidate position when the window does not protrude from the display region in a case where the arrangement candidate position and the center of the window match each other, arrange the center of the window at the position closest to the first position at which the window does not protrude from the display region after changing an angle and/or a size of the window based on a protrusion amount when the window protrudes from the display region, or arrange the center of the window at the position closest to the first position at which the window does not protrude from the display region without changing the angle and the size of the window.

* * * * *